(12) United States Patent
Kang et al.

(10) Patent No.: US 11,749,802 B2
(45) Date of Patent: Sep. 5, 2023

(54) METHOD FOR MANUFACTURING POROUS CARBON MATERIAL DOPED WITH HETEROGENEOUS ELEMENT AND POROUS CARBON MATERIAL DOPED WITH HETEROGENEOUS ELEMENT PREPARED THEREFROM

(71) Applicant: KOREA MARITIME UNIVERSITY INDUSTRY-ACADEMIC COOPERATION FOUNDATION, Busan (KR)

(72) Inventors: Jun Kang, Busan (KR); Dae Young Kim, Busan (KR)

(73) Assignee: KOREA MARITIME UNIVERSITY INDUSTRY-ACADEMIC COOPERATION FOUNDATION

( * ) Notice: Subject to any disclaimer, the term of this patent is extended or adjusted under 35 U.S.C. 154(b) by 147 days.

(21) Appl. No.: 17/356,745

(22) Filed: Jun. 24, 2021

(65) Prior Publication Data
US 2021/0408543 A1    Dec. 30, 2021

(30) Foreign Application Priority Data
Jun. 25, 2020 (KR) .......................... 10-2020-0078019

(51) Int. Cl.
*H01M 4/587* (2010.01)
*B01J 19/08* (2006.01)
(Continued)

(52) U.S. Cl.
CPC .......... *H01M 4/587* (2013.01); *B01J 19/088* (2013.01); *C01B 32/05* (2017.08);
(Continued)

(58) Field of Classification Search
CPC .............. H01M 4/587; H01M 10/054; H01M 2004/027; H01M 2004/028;
(Continued)

(56) References Cited

FOREIGN PATENT DOCUMENTS

KR    10-2020-0066750 A    6/2020

OTHER PUBLICATIONS

"Enhanced Electrocatalytic Stability of Platinum Nanoparticles Supported on Sulfur-Doped Carbon using in-situ Solution Plasma" Aug. 20, 2019 by Li et al (Year: 2019).*
(Continued)

*Primary Examiner* — Joshua L Allen
(74) *Attorney, Agent, or Firm* — Park & Associates IP Law Office

(57) ABSTRACT

A method for manufacturing a porous carbon material doped with a heterogeneous element and a porous carbon material doped with a heterogeneous element manufactured using the method are proposed. The method includes melting carbon precursor powder that contains one or more kinds of heterogeneous elements selected from metal and nonmetal to prepare a precursor melt; disposing a pair of metal wires in the precursor melt; and applying power to the metal wires to perform plasma-discharge, thus forming and aggregating carbon nanoparticles doped with the heterogeneous element while having a micropore and thereby forming a porous carbon material having a meso-macro hierarchical pore structure. As the heterogeneous element is bound to carbon of the carbon precursor, the carbon nanoparticles are formed in an amorphous structure while being doped with the heterogeneous element, thus increasing an active site.

5 Claims, 20 Drawing Sheets

(51) Int. Cl.
    *C01B 32/05*    (2017.01)
    *H01M 4/02*    (2006.01)
    *H01M 10/054*    (2010.01)

(52) U.S. Cl.
    CPC .................. *B01J 2219/0828* (2013.01); *B01J 2219/0877* (2013.01); *B01J 2219/0896* (2013.01); *C01P 2002/52* (2013.01); *C01P 2002/72* (2013.01); *C01P 2002/85* (2013.01); *C01P 2006/40* (2013.01); *H01M 10/054* (2013.01); *H01M 2004/027* (2013.01)

(58) Field of Classification Search
    CPC ............. H01M 2004/029; C01B 32/05; C01B 2002/52; C01B 2002/72; C01B 2002/85; B01J 19/088; B01J 2219/0828; B01J 2219/0877; B01J 2219/0896
    See application file for complete search history.

(56) References Cited

OTHER PUBLICATIONS

"Enhanced Hydrogen Storage on Pt-Doped Carbon by Plasma Reduction", Year: 2010 by Wang et al (Year: 2010).*
"The Effect of Electrode Gap Distance on the Synthesis of Carbon Materials by Using Solution Plasma Process" Date: Oct. 2015 by Lee et al (Year: 2015).*
"Synthesis, properties and applications of graphene doped with boron, nitrogen and other elements" Year: 2014 by Rao et al (Year: 2014).*

* cited by examiner

```
┌─────────────────────────────────────────────┐
│ melt carbon precursor powder containing one │
│              or more kinds                   │── S10
│ of heterogeneous elements selected from metal│
│  and nonmetal to prepare precursor melt     │
└─────────────────────────────────────────────┘
                      ⇩
┌─────────────────────────────────────────────┐
│ dispose a pair of metal wires in precursor melt │── S20
└─────────────────────────────────────────────┘
                      ⇩
┌─────────────────────────────────────────────┐
│ form and aggregate carbon nanoparticles doped│
│   with heterogeneous element while having    │
│     micropore through plasma discharge,      │── S30
│    thereby forming porous carbon material    │
│  having meso-macro hierarchical pore structure│
└─────────────────────────────────────────────┘
                      ⇩
┌─────────────────────────────────────────────┐
│       heat-treat porous carbon material      │── S40
│             at 500 to 1,000°C                │
└─────────────────────────────────────────────┘
```

FIG. 1

METHOD FOR MANUFACTURING POROUS CARBON MATERIAL DOPED WITH HETEROGENEOUS ELEMENT AND POROUS CARBON MATERIAL DOPED WITH HETEROGENEOUS ELEMENT PREPARED THEREFROM

REFERENCE TO RELATED APPLICATIONS

This application claims the priority benefit of Korean Patent Application No. 10-2020-0078019 filed on Jun. 25, 2020, the entire contents of which are incorporated herein by reference.

FIELD OF THE INVENTION

The present disclosure relates to a method for manufacturing a porous carbon material doped with a heterogeneous element and a porous carbon material doped with a heterogeneous element prepared using the method.

BACKGROUND OF THE INVENTION

A material containing carbon as a main component is applicable to various fields such as energy, the environment, and electronic materials due to excellent mechanical strength, thermal conductivity, electrical conductivity, and chemical stability. The carbon may be formed in various structures. Recently, after fullerene and carbon nanotubes have been discovered as hexagonal layered carbon such as graphite, they have attracted considerable attention. Fullerene refers to a molecule in which graphite structures are connected in the shape of a soccer ball. Carbon nanotubes refer to a structure in which graphite is rolled into a nano-sized diameter, and exhibits the characteristics of a metal or a semiconductor depending on an angle and a structure at which graphite is rolled. As such, the carbon may have various structures.

However, as a material for providing performance more excellent than that of a material using only carbon itself, a carbon material carried or doped with a heterogeneous element is expected to show more excellent performance for a field emission display, a hydrogen-storage-unit assembly, a fuel cell electrode, a lithium-ion-battery active material, a super-capacitor, an electromagnetic-wave shield, a light-weight and high-strength applied product, etc.

For example, in "Method for manufacturing heterogeneous-element doped carbon nanofiber, heterogeneous-element doped carbon nanofiber manufactured by the method, and carbon nanofiber-polymer composite using the same (Korean Patent Application Publication No. 10-2020-0066750)", a nanofiber is manufactured by electro-spinning and stabilizing a first solution containing a carbon precursor, the nanofiber is coated by immersing it in a second solution containing a phosphorus precursor, and then the nanofiber is doped with phosphorus (P) through a process of heat-treating the nanofiber coated with the second solution.

However, this is problematic in that the carbon precursor and the phosphorus precursor should be separately prepared and be subjected to a synthesis process, such as immersion, coating, and heat-treatment, to dope carbon with phosphorus, so that a lot of time is required, and the heat-treatment is necessarily required to dope the nanofiber with phosphorus.

Therefore, there is an urgent need for research on technology development that cannot only increase the content of a heterogeneous element doped in carbon using a single precursor, but can also reduce time for the synthesis process. (Patent Document 1) Korean Patent Application Publication No. 10-2020-0066750 (Jun. 11, 2020).

SUMMARY OF THE INVENTION

Accordingly, the present disclosure has been made keeping in mind the above problems occurring in the related art, and an objective of the present disclosure is to provide a method for manufacturing a porous carbon material doped with a heterogeneous element and a porous carbon material doped with a heterogeneous element prepared using the method, which are intended to increase an active site by increasing the content of the heterogeneous element doped onto carbon.

In order to achieve the objective of the present disclosure, the present disclosure provides a method for manufacturing a porous carbon material doped with a heterogeneous element, the method including melting carbon precursor powder that contains one or more kinds of heterogeneous elements selected from metal and nonmetal to prepare a precursor melt; disposing a pair of metal wires in the precursor melt; and applying power to the metal wires to perform plasma-discharge, thus forming and aggregating carbon nanoparticles doped with the heterogeneous element while having a micropore and thereby forming a porous carbon material having a meso-macro hierarchical pore structure, wherein, as the heterogeneous element is bound to carbon of the carbon precursor, the carbon nanoparticles are formed in an amorphous structure while being doped with the heterogeneous element, thus increasing an active site.

The method may further include heat-treating the porous carbon material at 500 to 1,000° C.

A heterogeneous-element doping quantity for the porous carbon material may be in a range of 1 to 10 at %.

The metal of the heterogeneous element may be one or more selected from a group consisting of platinum (Pt), palladium (Pd), gold (Au), ruthenium (Ru), iridium (Ir), tin (Sn), aluminum (Al), lithium (Li), sodium (Na), copper (Cu), zinc (Zn), magnesium (Mg), cobalt (Co), manganese (Mn), nickel (Ni), and iron (Fe), and the nonmetal may be one or more selected from a group consisting of phosphorus (P), sulfur (S), selenium (Se), boron (B), nitrogen (N), and silicon (Si).

In order to achieve the objective of the present disclosure, the present disclosure provides a porous carbon material doped with a heterogeneous element manufactured using the above-described method.

The method for manufacturing the porous carbon material doped with the heterogeneous element and the porous carbon material doped with the heterogeneous element prepared using the method according to the present disclosure have the following effects.

First, the present disclosure is advantageous in that carbon nanoparticles doped with heterogeneous elements while having micropores are formed by performing a solution plasma process using only a precursor melt obtained by melting carbon precursor powder containing the heterogeneous element without using a separate additive, and the carbon nanoparticles are aggregated, thus manufacturing a porous carbon material having a hierarchical pore structure of mesopores and macropores.

Second, the present disclosure is advantageous in that an amorphous structure is generated due to defects occurring in carbon nanoparticles when carbon is doped with a heterogeneous element, so that an active site increases, thus facilitating the adsorption behavior of ions, and mesopores and macropores reduce the diffusion distance of ions, thus accelerating ion transport.

BRIEF DESCRIPTION OF THE DRAWINGS

The above and other objectives, features, and other advantages of the present disclosure will be more clearly understood from the following detailed description when taken conjointly with the accompanying drawings, in which:

FIG. 1 is a flowchart showing a method for manufacturing a porous carbon material doped with a heterogeneous element according to the present disclosure.

DETAILED DESCRIPTION OF THE INVENTION

Figure 2:
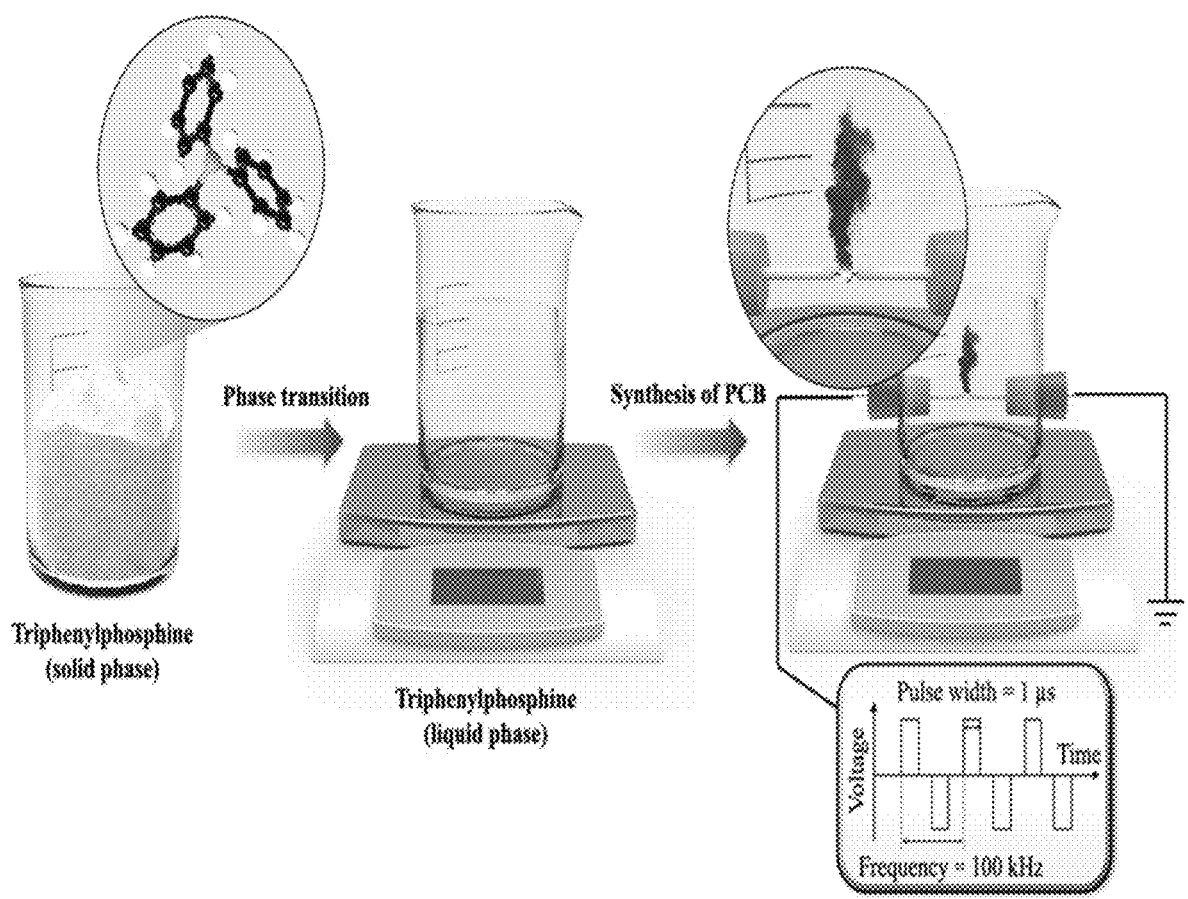
FIG. 2 is a conceptual diagram showing a method for manufacturing a phosphorus-doped porous carbon material according to a first embodiment.

Hereinafter, the present disclosure will be described in detail.

Herein, a macropore means a pore having an average diameter that is more than 50 nm, a mesopore means a pore having an average diameter that ranges from 2 nm to 50 nm, and a micropore means a pore having an average diameter that is less than 2 nm.

Furthermore, herein, an amorphous structure means a structure in which carbon nanoparticles do not have regularity but exhibit somewhat disordered directivity, i.e. amorphousness.

Furthermore, an active site described herein means a space where atom ions are adsorbed.

In an aspect, the present disclosure is directed to a method for manufacturing a porous carbon material doped with a heterogeneous element. Carbon precursor powder containing one or more kinds of heterogeneous elements selected from metal and nonmetal is melted and a precursor melt is subjected to a solution plasma process, so that carbon nanoparticles doped with the heterogeneous element while having a micropore are formed and aggregated, thus forming a porous carbon material having a meso-macro hierarchical pore structure.

In this context, FIG. 1 is a flowchart showing a method for manufacturing a porous carbon material doped with a heterogeneous element according to the present disclosure. Referring to FIG. 1, the method for manufacturing the porous carbon material doped with the heterogeneous element according to the present disclosure includes a first step S10 of melting carbon precursor powder that contains one or more kinds of heterogeneous elements selected from metal and nonmetal to prepare a precursor melt, a second step S20 of disposing a pair of metal wires in the precursor melt, a third step S30 of applying power to the metal wires to perform plasma-discharge, thus forming and aggregating carbon nanoparticles doped with the heterogeneous element while having a micropore and thereby forming a porous carbon material having a meso-macro hierarchical pore structure, and a fourth step S40 of heat-treating the porous carbon material at 500 to 1,000° C.

Thus, as the heterogeneous element is bound to carbon of the carbon precursor, carbon nanoparticles having an increased active site are formed in the amorphous structure while being doped with the heterogeneous element, and a porous carbon material in which the carbon nanoparticles are aggregated is manufactured.

Particularly, even if carbon is a promising electrode material in an electrochemical energy storage system, carbon has become an obstacle in a practical use due to poor electrochemical performance. In order to solve the problem, the present disclosure provides a simple and novel method unlike a conventional synthesis method, in other words, is intended to synthesize a porous carbon material doped with a heterogeneous element using a solution plasma process (SPP).

In the above-described manufacturing method, first, the first step is the step of melting the carbon precursor powder that contains one or more kinds of heterogeneous elements selected from metal and nonmetal to prepare the precursor melt (S10).

Prior to the description, in order to usually synthesize carbon using the solution plasma process, a hydrocarbon precursor present in a liquid phase at room temperature is required. Furthermore, in order to dope carbon with the heterogeneous element, a precursor formed of additional metal, nonmetal, or mixtures thereof is separately required, and a doping quantity is also small. Thus, in order to simultaneously perform a carbon synthesis and heterogeneous-element doping at the first step, it is possible to increase the doping quantity of the heterogeneous element doped in carbon using only a single precursor in a powder form.

In other words, at the first step, the carbon precursor powder that contains one or more kinds of heterogeneous elements selected from metal and nonmetal present in a solid powder state at room temperature is heated and stirred at 75 to 95° C., thus producing the precursor melt. Such a precursor melt is subsequently subjected to the carbon synthesis and the heterogeneous element doping in situ, thus synthesizing carbon nanoparticles doped with the heterogeneous element, and simultaneously synthesizing a porous carbon material in which the carbon nanoparticles doped with the heterogeneous element are aggregated.

When the carbon precursor containing the heterogeneous element is melted, the temperature should be equal to or more than a melting point at which the carbon precursor powder containing the heterogeneous element may be melted. If the temperature is less than 75° C., it takes a long time to melt the carbon precursor powder containing the heterogeneous element up to 100%, so that it is inefficient. If the temperature is more than 95° C., it is advantageous in that the carbon precursor powder containing the heterogeneous element may be melted within a short time. However, too high temperature may cause a change in physical properties of the precursor melt, so that this is not preferable for the carbon synthesis and the heterogeneous-element doping.

Among the heterogeneous element, the metal may be any one of platinum (Pt), palladium (Pd), gold (Au), ruthenium (Ru), iridium (Ir), tin (Sn), aluminum (Al), lithium (Li), sodium (Na), copper (Cu), zinc (Zn), magnesium (Mg), cobalt (Co), manganese (Mn), nickel (Ni), and iron (Fe). Further, the nonmetal may be any one of phosphorus (P), sulfur (S), selenium (Se), boron (B), nitrogen (N), and silicon (Si).

For instance, the carbon precursor powder containing the metallic heterogeneous element may be triphenylphosphine, while the carbon precursor powder containing the nonmetallic heterogeneous element may be Tetrakis(triphenylphosphine)platinum(0). However, the carbon precursor powder that contains one or more kinds of heterogeneous elements selected from metal and nonmetal is not limited to the above-described kind, and may be used in various ways as long as a powdery carbon compound containing the heterogeneous element formed of metal, nonmetal or mixtures thereof may be melted.

Next, the second step is the step of disposing the pair of metal wires in the precursor melt (S20).

The second step is a preparation step to synthesize carbon using only the precursor melt that melts the carbon precursor powder containing the heterogeneous element, and to dope carbon with a high content of heterogeneous element. In order to form the carbon nanoparticle and the porous carbon material doped with the heterogeneous element through the solution plasma process, a chamber, a pair of tungsten carbides that are electrodes located in the chamber, a ceramic tube surrounding to protect the tungsten carbides, and a power supply part for applying power to the electrode are prepared.

The chamber defines space in which the precursor melt is accommodated, and provides space in which the solution plasma process occurs. The electrodes are arranged in a row to longitudinally face each other in the chamber so as to arouse the solution plasma process and form the carbon nanoparticle and the porous carbon material doped with the heterogeneous element. However, the electrode will be interpreted as the same meaning as the metal wire.

Next, the third step is the step of applying power to the metal wires to perform plasma-discharge, thus forming and aggregating the carbon nanoparticles doped with the heterogeneous element while having the micropores and thereby forming the porous carbon material having the meso-macro hierarchical pore structure (S30).

In order to enhance the electric conductivity of carbon, carbon is doped with one or more kinds of heterogeneous elements selected from metal and nonmetal. At the third step, the porous carbon material may be synthesized while carbon is doped with the heterogeneous element through the solution plasma process.

For example, since phosphorus dopant (P dopant) among metals is relatively less electronegative than carbon, it is doped onto carbon on the principle that it acts as an electron donor in carbon to move the Fermi level towards a conduction band. As the doping of phosphorus causes defects in the carbon nanoparticles to increase the quantity of the active site, electrochemical performance is improved. In other words, due to a difference in bond length and atomic size of the phosphorus dopant, defects and active sites may occur in a carbon skeleton because of the doping of phosphorus. The defects and active sites are to energetically improve the adsorption capacity of ions.

The solution plasma process is performed by applying bipolar pulsed direct current power with the pulse width of 0.1 to 3 μs, the frequency of 80 to 150 kHz, and the voltage of 1.0 to 5.0 kV.

If the pulse width is less than 0.1 μs, the carbon nanoparticle is not sufficiently doped with the heterogeneous element. If the pulse width is more than 3 μs, over-reaction occurs in a process where the carbon synthesis and the heterogeneous-element doping are performed, thus hindering the active site from increasing. Therefore, the pulse width is preferably in the range of 0.1 to 3 μs, and is most preferably 1 μs.

If the frequency is less than 80 kHz, a phenomenon where plasma is turned off occurs. If the frequency is more than 150 kHz, plasma may be transformed into arc plasma. On this account, the frequency preferably ranges from 80 to 150 kHz, and 100 kHz is most preferable.

If the voltage is less than 1.0 kV, the voltage is not sufficient, so that there is a risk that plasma is turned off during plasma discharge. If the voltage is more than 5.0 kV, plasma is transformed into arc plasma, so that it is not only difficult to form the carbon nanoparticle doped with the heterogeneous element, but the carbon nanoparticles doped with the heterogeneous element are not aggregated. Thus, the voltage preferably ranges from 1.0 to 5.0 kV, and 2.0 kV is most preferable.

The precursor melt is subjected to the solution plasma process to be formed into carbon nanoparticles doped with the heterogeneous element having the size of 20 to 40 nm, and then the carbon nanoparticles are aggregated, thus forming the porous carbon material having the meso-macro hierarchical pore structure.

If the size of the carbon nanoparticle doped with the heterogeneous element is less than 20 nm, it is difficult to sufficiently make the meso-macro hierarchical pore structure of the porous carbon material, so that the diffusion distance of ions is not only reduced, but the space of the active site where the ions may be adsorbed is also narrow. If the size of the carbon nanoparticle doped with the heterogeneous element is more than 40 nm, it is difficult to diffuse ions. Thus, the carbon nanoparticle doped with the heterogeneous element is preferably formed to have the size of 20 to 40 nm, thus shortening a path where ions may be diffused in the porous carbon material. Consequently, the ions may be rapidly diffused into the carbon nanoparticle and adsorbed.

Particularly, the porous carbon material doped with the heterogeneous element may have the BET specific surface area of 200 to 400 $m^2/g$. If the BET specific surface area of the porous carbon material doped with the heterogeneous element is less than 200 $m^2/g$, no sufficient contact force is imparted to an interface between the electrode and electrolyte, thus hindering movement of the ions. If the BET specific surface area of the porous carbon material doped with the heterogeneous element is more than 400 $m^2/g$, there may be sufficient contact in the interface between the electrode and the electrolyte. However, the BET specific surface area is too large, thus causing a side reaction. Consequently, initial Coulombic efficiency is sharply lowered, and a lifespan is reduced. Therefore, the porous carbon material preferably has the specific surface area of 200 to 400 $m^2/g$.

Finally, the fourth step is the step of heat-treating the porous carbon material at 500 to 1,000° C. (S40).

In other words, the porous carbon material is heat-treated at 500 to 1,000° C. so as to increase its electric conductivity. Through the heat treatment, the porous carbon material obtains an excellent charge/discharge profile. The heat-treated porous carbon material does not only have a micropore, but also has the hierarchical pore structure of the mesopore and the macropore, thus providing larger contact between ions and a host material, shortening an ion transport path, and increasing speed performance.

Particularly, through the heat treatment, the doping quantity of the heterogeneous element is controlled, and hydrogen is removed from an inside to form a complete pore structure, so that carbonization is achieved and simultaneously electric conductivity is secured.

If the heat-treatment temperature is less than 500° C., complete carbonization is not performed, carbon is not doped with the heterogeneous element in the range of 1 to 10 at % (preferably, 4 at % or more), and all hydrogen is not removed from the porous carbon material, so that sufficient electric conductivity may not be provided. If the heat-treatment temperature is more than 1,000° C., the physical properties of the porous carbon material may be changed. Thus, this temperature is not preferable.

In another aspect, the present disclosure relates to a porous carbon material doped with a heterogeneous element, and is characterized in that carbon nanoparticles doped with the heterogeneous element are manufactured through the above-described method and then are aggregated, thus forming the porous carbon material.

That is, after a pair of metal wires is disposed in the precursor melt prepared by melting the carbon precursor powder containing one or more kinds of heterogeneous elements selected from metal and nonmetal, power is applied to the metal wires to perform plasma discharge, so that the carbon nanoparticles doped with the heterogeneous element while having the micropores are formed and aggregated, thus forming the porous carbon material having the meso-macro hierarchical pore structure. As the heterogeneous element is bound to carbon of the carbon precursor, the carbon nanoparticle is formed in the amorphous structure while being doped with the heterogeneous element, thus increasing the active site.

The porous carbon material may contain a high doping quantity of heterogeneous element ranging from 1 to 10 at %. Unlike the related art where the content of the heterogeneous element doped onto carbon is very small, according to the present disclosure, in order to enhance the electric conductivity, the heterogeneous element for doping should be at least 1 at % or more. Particularly, it is possible to increase the doping quantity of the heterogeneous element to 4 at % or more, at most 10 at %.

In summary, the present disclosure is directed to the method for manufacturing the porous carbon material doped with the heterogeneous element and the porous carbon material doped with the heterogeneous element prepared using the method. The present disclosure overcomes the problems of the related art where the carbon precursor and the heterogeneous-element precursor are separately prepared and synthesized, so that a lot of time is required, and the content of the heterogeneous element doped onto carbon is also less than 2 at %. According to the present disclosure, only the precursor melt, prepared by melting the carbon precursor powder containing one or more kinds of heterogeneous elements selected from metal and nonmetal, is subjected to the solution plasma process, so that the heterogeneous element is bound to carbon of the carbon precursor. Thus, it is formed in the amorphous structure while being doped with the heterogeneous element up to 10 at %, thus increasing the active site.

In other words, in the method for manufacturing the porous carbon material doped with the heterogeneous element according to the present disclosure, only the precursor melt prepared by melting the carbon precursor powder that contains one or more kinds of heterogeneous elements selected from metal and nonmetal is subjected to the solution plasma process, thus synthesizing the porous carbon material doped with the heterogeneous element in situ.

Particularly, the heterogeneous-element doping of the porous carbon material and the amorphous structure provide ion adsorption having rich active sites and excellent capacity, and the mesopore and macropore reduce an ion diffusion distance, thus allowing ions to be more easily transported and thereby realizing an excellent charge/discharge capacity.

Hereinafter, embodiments of the present disclosure will be described in detail. However, the following embodiments are merely illustrative to help understanding the present disclosure, and the scope of the present disclosure is not limited thereto.

First Embodiment

Referring to FIG. 2 that is a conceptual diagram showing a method for manufacturing a phosphorus-doped porous carbon material according to a first embodiment, first, triphenylphosphine was prepared as the carbon precursor powder containing phosphorus (P) that is nonmetal. Since triphenylphosphine having a melting point at about 80° C. is present in a solid phase at room temperature, triphenylphosphine was heated and stirred at 80° C. to produce the liquid-phase precursor melt.

Subsequently, the porous carbon material with the aggregated phosphorus-doped carbon nanoparticles was synthesized through the solution plasma process for 10 minutes. At this time, the pulse width was set to be 1 µs, the frequency was set to be 100 kHz, and a bipolar high voltage pulse of 2.0 kV was applied to a pair of tungsten carbide electrodes through a PeKuris MPP-HV04 high voltage bipolar pulse generator.

The synthesized porous carbon material was vacuum filtered through a mixed cellulose ester (MCE) membrane having the pore size of 0.45 µm. Subsequently, it was repeatedly washed with deionized water to remove the residual organic matter, and was vacuum dried at 90° C. for 12 hours.

After the dried porous carbon material was uniformly pulverized and then was heated at 500° C. at the heating rate of 10° C./min, it was maintained for 3 hours and was heat treated in a quartz tube furnace in a nitrogen atmosphere. The heat-treated phosphorus-doped porous carbon material was indicated as PCB-500.

Second Embodiment

Triphenylphosphine was prepared as the carbon precursor powder containing phosphorus (P) that is nonmetal. Since triphenylphosphine having a melting point of about 80° C. is present in a solid phase at room temperature, triphenylphosphine was heated and stirred at 80° C. to produce the liquid-phase precursor melt.

Subsequently, the porous carbon material with the aggregated phosphorus-doped carbon nanoparticles was synthesized through the solution plasma process for 10 minutes. At this time, the pulse width was set to be 1 µs, the frequency was set to be 100 kHz, and a bipolar high voltage pulse of 2.0 kV was applied to a pair of tungsten carbide electrodes through a PeKuris MPP-HV04 high voltage bipolar pulse generator.

The synthesized porous carbon material was vacuum filtered through a mixed cellulose ester (MCE) membrane having the pore size of 0.45 µm. Subsequently, it was repeatedly washed with deionized water to remove the residual organic matter, and was vacuum dried at 90° C. for 12 hours.

After the dried porous carbon material was uniformly pulverized and then was heated at 1000° C. at the heating rate of 10° C./min, it was maintained for 3 hours and was heat treated in a quartz tube furnace in a nitrogen atmosphere. The heat-treated phosphorus-doped porous carbon material was indicated as PCB-1000.

Third Embodiment

Tetrakis(triphenylphosphine)platinum(0) was prepared as the carbon precursor powder containing platinum (Pt), which is a metal. This was heated and stirred at about 80° C. to produce the liquid-phase precursor melt.

Subsequently, the porous carbon material with the aggregated platinum-doping carbon nanoparticles was synthesized through the solution plasma process for 10 minutes. At this time, the pulse width was set to be 1 µs, the frequency was set to be 100 kHz, and a bipolar high voltage pulse of 2.0 kV was applied to a pair of tungsten carbide electrodes through a PeKuris MPP-HV04 high voltage bipolar pulse generator.

The synthesized porous carbon material was vacuum filtered through a mixed cellulose ester (MCE) membrane having the pore size of 0.45 µm. Subsequently, it was repeatedly washed with deionized water to remove the residual organic matter, and was vacuum dried at 90° C. for 12 hours.

After the dried porous carbon material was uniformly pulverized and then was heated at 500° C. at the heating rate of 10° C./min, it was maintained for 3 hours and was heat treated in a quartz tube furnace in a nitrogen atmosphere.

First Test Example

In this test example, the material characteristics and the electrochemical characteristics of the phosphorus-doped porous carbon materials (PCB-500 and PCB-1000) with the aggregated phosphorus-doped carbon nanoparticles manufactured according to the first and second embodiments were tested.

As for the test of the material characteristics, the structure of the phosphorus-doped porous carbon material was tested by the XRD with filtered Cu Kα radiation (RIGAKU, SmartLab). The $N_2$ adsorption-desorption isotherm was collected at 77K using a $N_2$ adsorption analyzer (MicrotracBEL Corp., BELSORP-max). The specific surface area was calculated by the BET method. The pore-size distribution was obtained from the adsorption branch of the isotherm using the BJH and MP methods. The XPS (Thermo Fisher Scientific) was performed using mono Al Kα radiation along with an ESCALAB 250 spectrometer. The morphology was observed by TEM and HRTEM (JEM-2100F). Element mapping was performed through EDS attached to a TEM device.

Regarding an electrochemical characteristic test, the electrochemical performance was performed in an Ar filled glove box ($O_2$ and $H_2O$<0.1 ppm) using coin type half-cells (CR2032, Wellcos corp). The galvanostatic charge-discharge test was performed in the voltage range of 0.01 to 3.0V (vs. $Na^+$/Na) using a BCS-805 Biologic battery test system. Cyclic voltammetry (CV) was performed using the same system, and EIS was performed with a sine wave having the perturbative amplitude of 5 mV in the frequency range of 10 kHz to 0.01 Hz. An operational electrode manufactured slurry by mixing 70 wt % active material, 10 wt % conductive carbon black (SuperP), and 20 wt % carboxymethyl cellulose (CMC) in deionized water. The slurry produced in this way was uniformly coated onto a copper foil (Cu foil) using a doctor blade and was dried in a vacuum oven at 80° C. for 12 hours. The operational electrode was cut into a wafer having the diameter of 14 mm and the mass of 0.4 to 0.5 mg cm$^{-2}$. Sodium metal was used as a relative electrode, glass fiber was used as a separator, and 1.0 mol/L NaPF6 dissolved in diethylene glycol dimethyl ether (DEGDME) was used as the electrolyte.

Morphology Characteristic Test

The morphology of the shape and structure of the phosphorus-doped porous carbon material manufactured according to the first and second embodiments may be confirmed by an SEM photograph and a TEM photograph.

Figure 3:
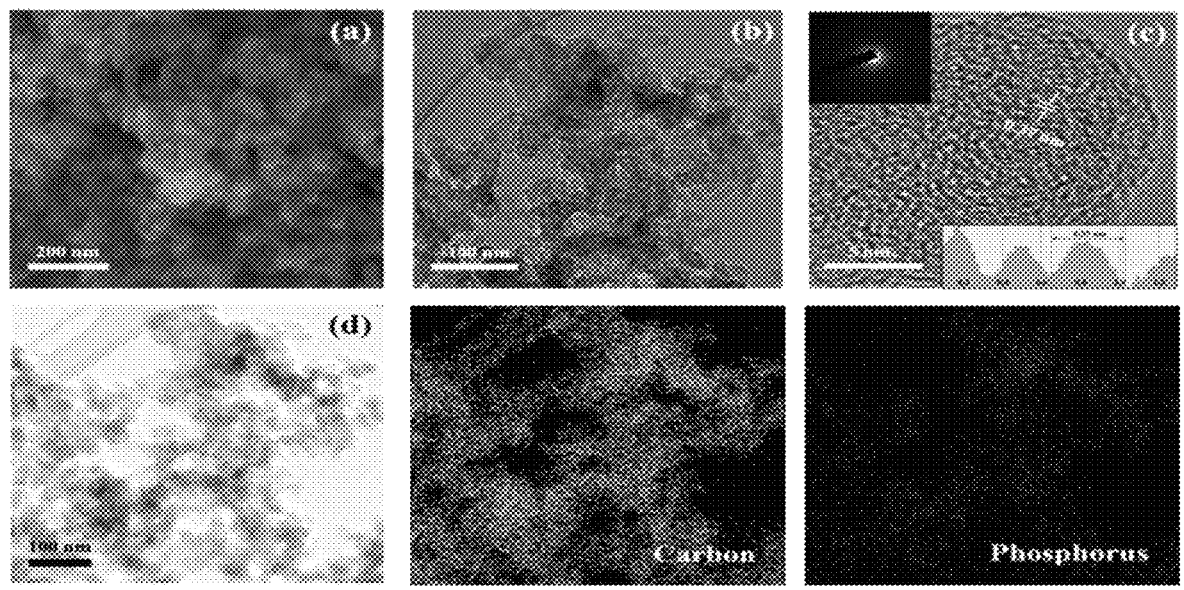
FIG. 3 is a morphology showing a phosphorus-doped porous carbon material according to the first embodiment.

FIG. 3 is a morphology showing the phosphorus-doped porous carbon material according to the first embodiment. FIG. 3(a) is the SEM photograph showing the phosphorus-doped porous carbon material. It can be confirmed that the phosphorus-doped carbon nanoparticle is formed in the shape of a sphere having the diameter of 20 to 40 nm, and the phosphorus-doped carbon nanoparticles are aggregated through the process described in a diffusion-limited aggregation model. Further, referring to FIG. 3(a), it can be seen that the aggregated phosphorus-doped carbon nanoparticles are connected to the meso-macro hierarchical pore structure.

FIG. 3(b) is the TEM photograph showing the phosphorus-doped porous carbon material, and FIG. 3(c) is the HRTEM photograph showing the phosphorus-doped porous carbon material. Referring to FIGS. 3(b) and 3(c), it is possible to confirm the shape and microstructure of the phosphorus-doped porous carbon material, and it can be seen that the size and shape of a particle correspond to the SEM photograph of FIG. 3(a). Furthermore, it is confirmed that the meso-macro hierarchical pore structure is formed on the porous carbon material in which the phosphorus-doped carbon nanoparticles are aggregated.

Particularly, it is confirmed in an SAED pattern perpendicular to a graphene layer inserted into a left upper end in FIG. 3(c), an intensity line profile, and an HRTEM photograph that most of the phosphorus-doped porous carbon material according to the first embodiment has an amorphous non-crystalline or amorphous structure.

The amorphous non-crystalline characteristics are because carbon particles are formed and grown in a hot plasma area in a process of synthesizing the phosphorus-doped porous carbon material, and diffused into a low-temperature liquid phase. Due to a large temperature gradient between plasma and the liquid-phase area, carbon is rapidly cooled to be frozen in the amorphous structure. However, some crystalline areas appear through a subsequent heat treatment.

It can be seen in FIG. 3(c) that, when a distance between some graphene sheets is measured using DigitalMicrograph software, the distance is 0.371 nm.

Meanwhile, FIG. 3(d) shows an EDS mapping image, and it can be confirmed that elements are uniformly distributed in carbon and phosphorus areas.

Figure 4:
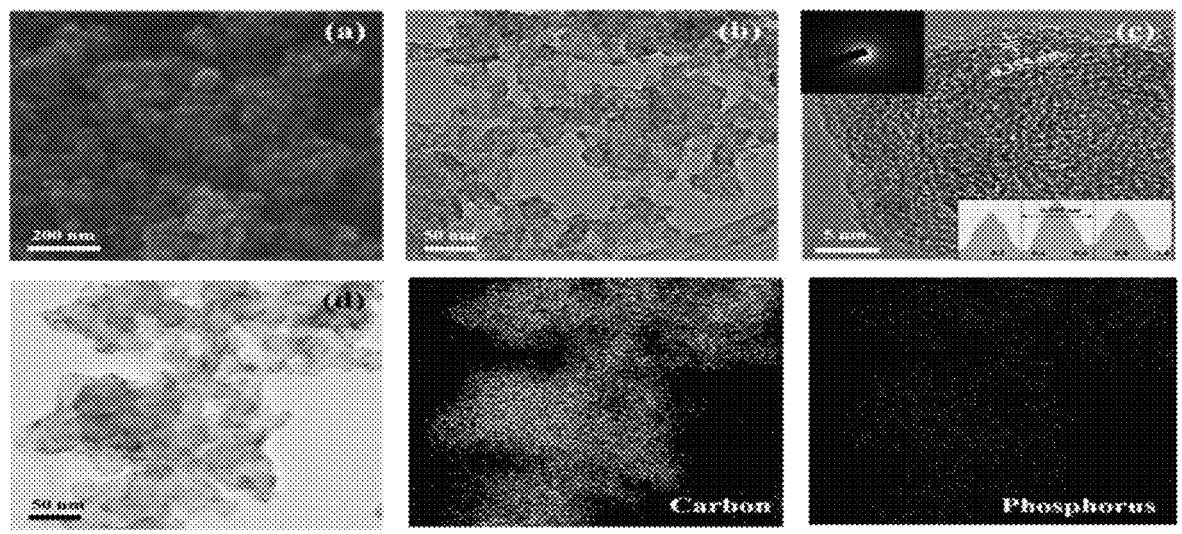
FIG. 4 is a morphology showing a phosphorus-doped porous carbon material according to a second embodiment.

FIG. 4 is a morphology showing the phosphorus-doped porous carbon material according to the second embodiment. Although the shape and particle size similar to those of FIG. 3 are observed in FIG. 4, it can be seen that a more distorted graphene layer is formed due to relatively high heat-treatment temperature, thus resulting in further graphitization.

It can be seen in FIG. 4(c) that, when a distance between some graphene sheets is measured using DigitalMicrograph software, the distance is 0.355 nm.

XRD Characteristic Test

Figure 5:
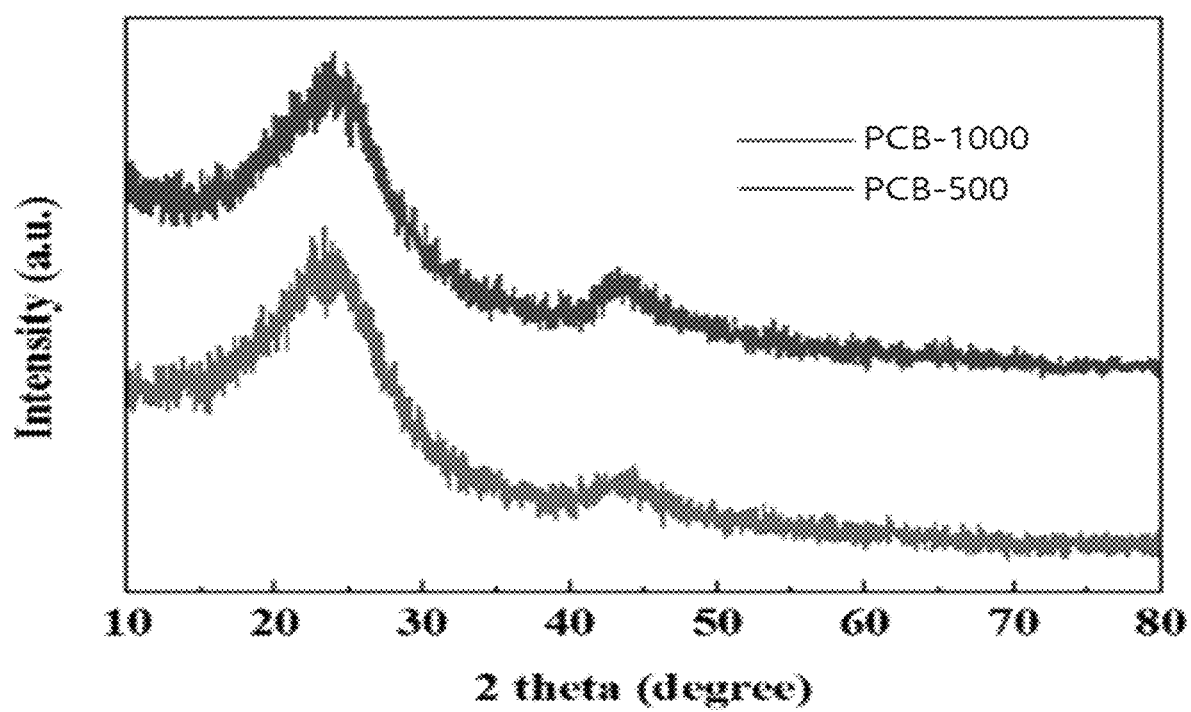
FIG. 5 is a graph showing XRD (X-ray diffraction) patterns of the phosphorus-doped porous carbon materials according to the first and second embodiments.

FIG. 5 is a graph showing XRD (X-ray diffraction) patterns of PCB-500 and PCB-1000. Referring to FIG. 5, both the PCB-500 and the PCB-1000 have peaks at about 24° and 43°, which are related to (002) and (100) planes of graphite, respectively. The peaks are wide, thus indicating the amorphous structure.

At higher heat-treatment temperature, the (002) diffraction peak shifted slightly, and d002 values calculated from the (002) diffraction peak using the Bragg's law were 0.375 nm and 0.369 nm for the PCB-500 and the PCB-1000, respectively.

If both the d-distances are greater than that of the graphite (0.335 nm), and the d002 value is relatively higher, this exhibits a more amorphous structure than that of the carbon skeleton. Meanwhile, it can be seen that, as the d002 value caused by the higher heat-treatment temperature is reduced, it corresponds to the TEM analysis result and a PCB-1000 sample is further crystallized.

$N_2$ Adsorption-Desorption Isotherm and Pore Distribution Characteristic Test

Figure 6A:
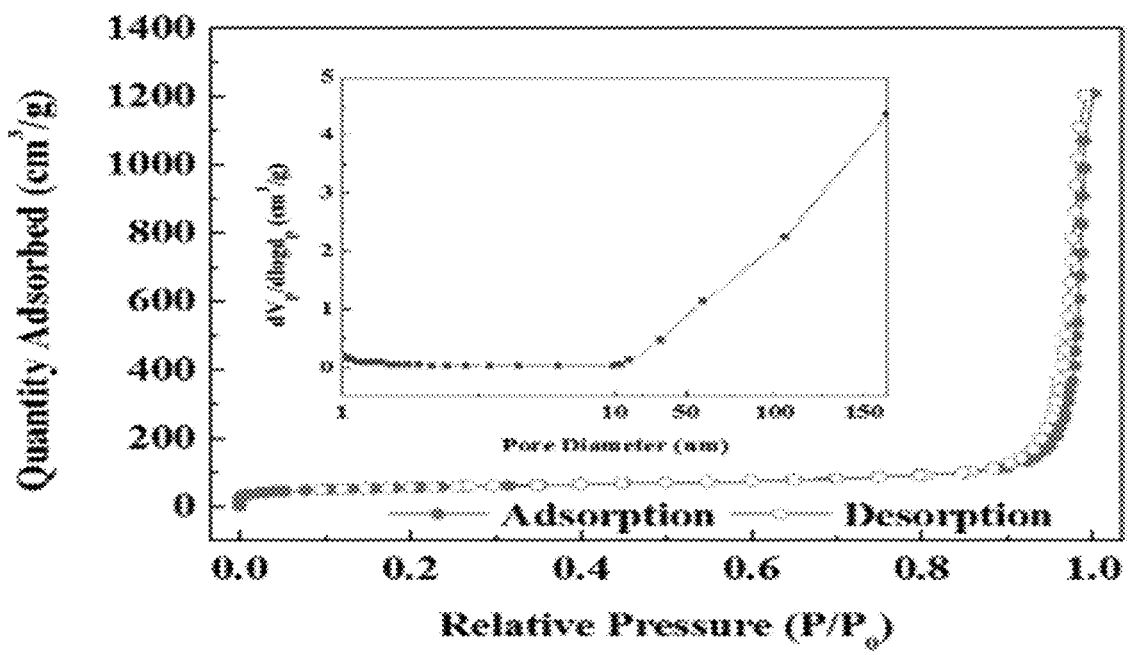
FIG. 6A is a graph showing an $N_2$ adsorption-desorption isotherm of the phosphorus-doped porous carbon material according to the first embodiment.

FIG. 6A is a graph showing an $N_2$ adsorption-desorption isotherm to check the porosity of PCB-500, and shows that an adsorbed quantity increases in an initial P/P$_0$ due to the $N_2$ adsorption of a single layer in the micropores. Further, the continuous adsorption of the $N_2$ and H3-type hysteresis loop at high P/P$_0$ suggests the presence of mesopores and macropores. Referring to FIG. 6A, the BET specific surface area of the PCB-500 is 203.33 m$^2$/g, and the pore-size distribution curve calculated by the BJH method has the meso-macro hierarchical pore structure.

Figure 6B:
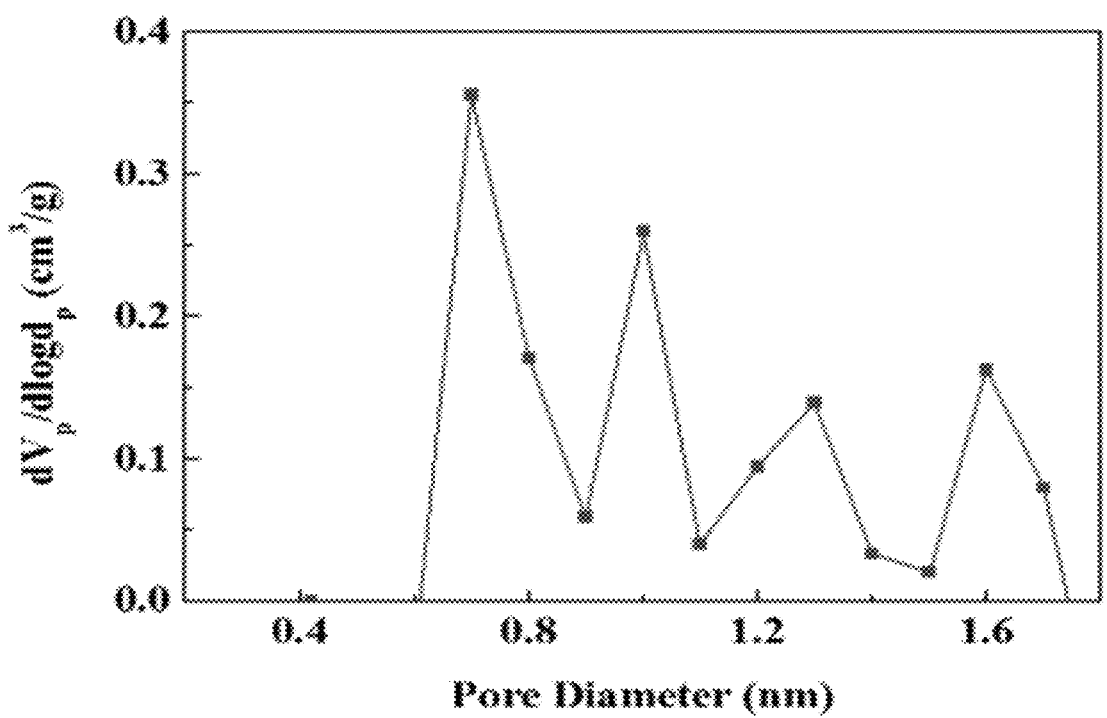
FIG. 6B is a graph showing the micropores size distribution of the phosphorus-doped porous carbon material according to the first embodiment.

FIG. 6B is a graph showing the micropores size distribution of the phosphorus-doped carbon nanoparticle of PCB-500. Referring to the figure, a narrow distribution of 0.6 to 0.7 nm plotted by the MP method shows the presence of the micropores.

The result of FIGS. 6A and 6B shows that the PCB-500 has the hierarchical pore structure composed of the micropores, the mesopores, and the macropores. As such, the presence of the meso-macropores is advantageous to rapidly diffuse sodium ions, provides a buffer for accommodating a change in volume in carbon, and contributes to structural stability. Further, the presence of the micropores may provide a high specific surface area to accumulate sufficient ions or charges in the interface between the electrode and the electrolyte.

Figure 7A:
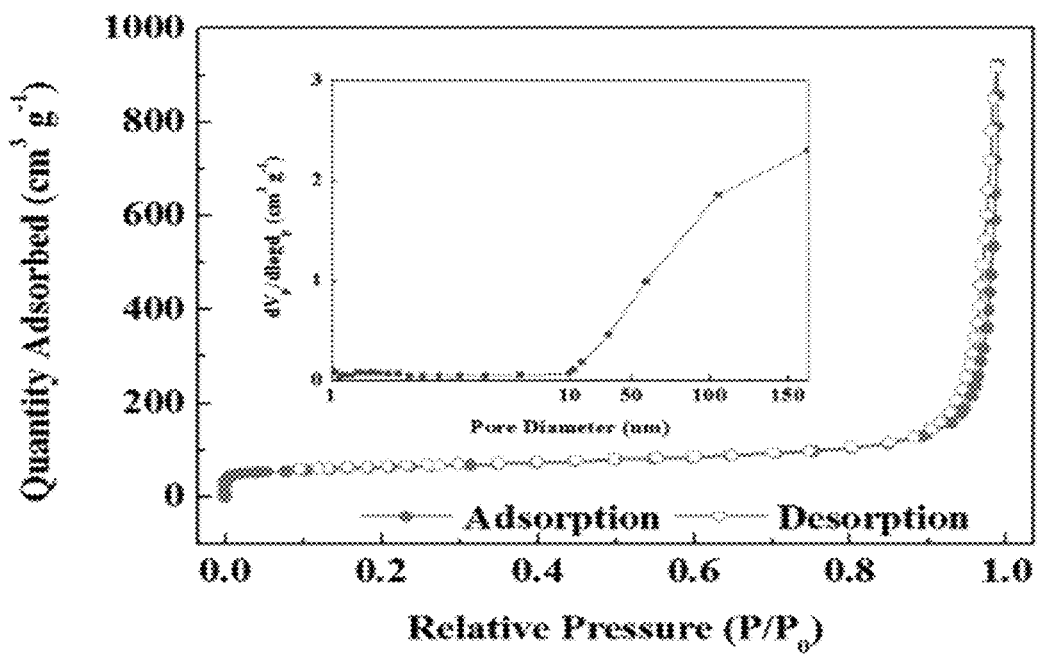
FIG. 7A is a graph showing an $N_2$ adsorption-desorption isotherm of the phosphorus-doped porous carbon material according to the second embodiment.
Figure 7B:
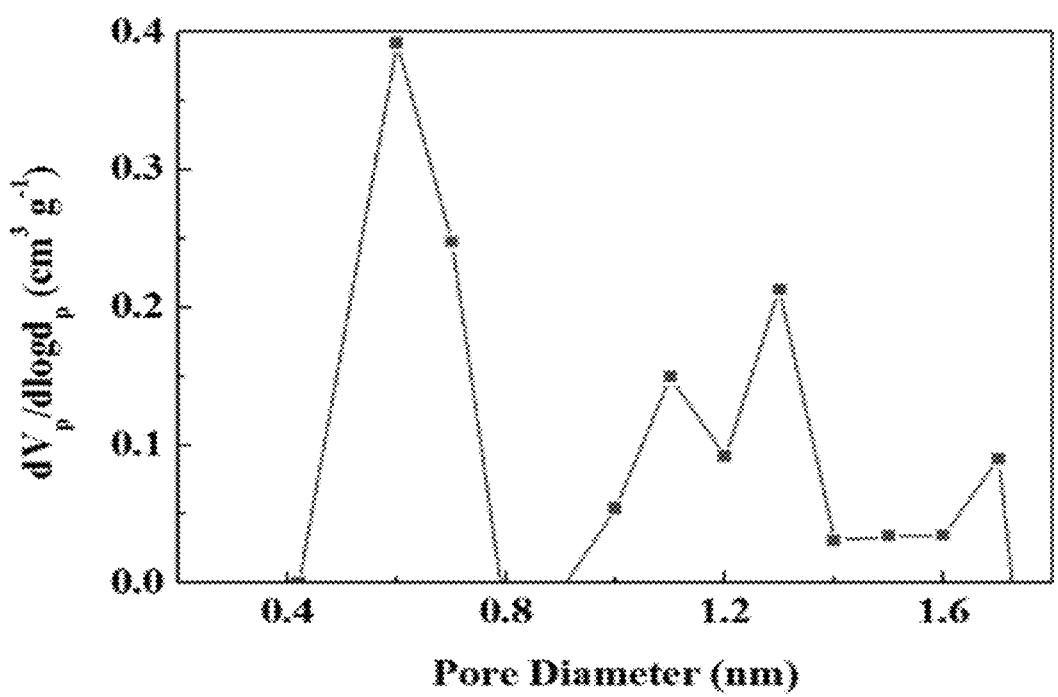
FIG. 7B is a graph showing the micropores size distribution of the phosphorus-doped porous carbon material according to the second embodiment.

FIGS. 7A and 7B show the $N_2$ adsorption-desorption isotherm and micropores size distribution of PCB-1000. Crystallization at 1,000° C. higher than PCB-500 that is heat treated at 500° C. reduces the quantity of the meso-macropores, but increases the micropores, thus having a higher specific surface area. That is, the PCB-1000 has the specific surface area of 219.92 m$^2$/g, unlike the PCB-500.

Test for Confirming Whether Phosphorus is Doped

An X-ray photoelectron analysis was used to test whether phosphorus (P) atoms were doped onto the carbon (C) skeleton.

Figure 8A:
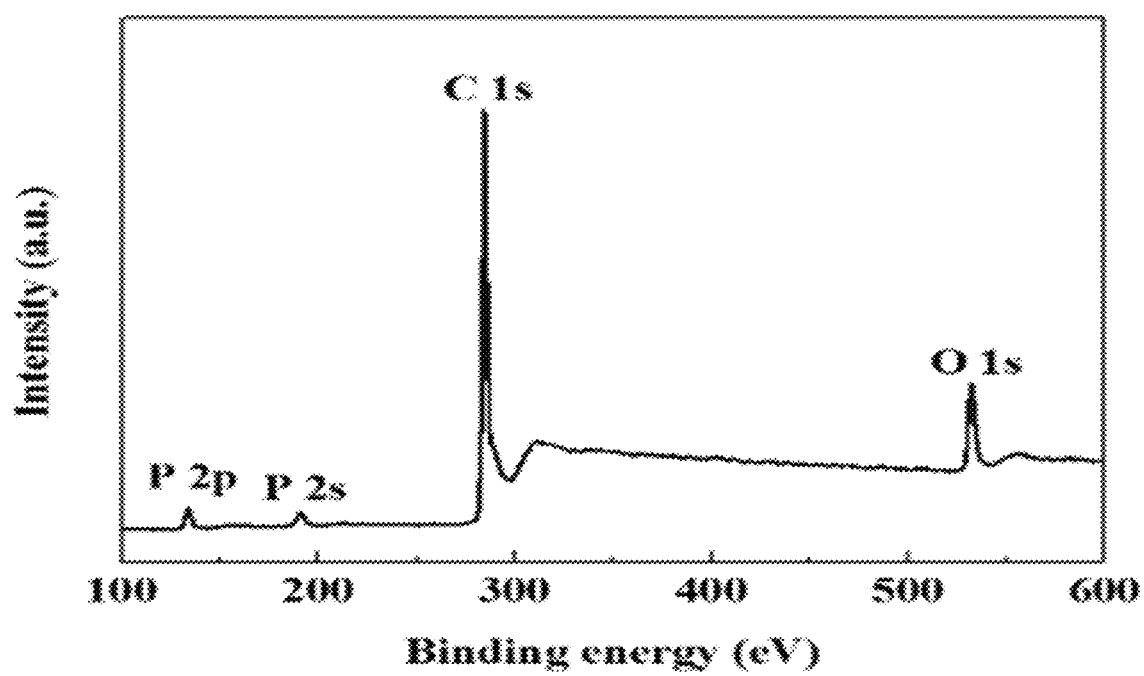
FIG. 8A is a graph showing an XPS spectrum of the phosphorus-doped porous carbon material according to the first embodiment.

FIG. 8A is a graph showing the XPS spectrum of the phosphorus-doped porous carbon material according to the first embodiment. In the drawing, the presence of C, O, and P may be confirmed, and it is confirmed that C is 85.7 at %, O is 10.3 at %, and P is 4.0 at %.

Figure 8B:
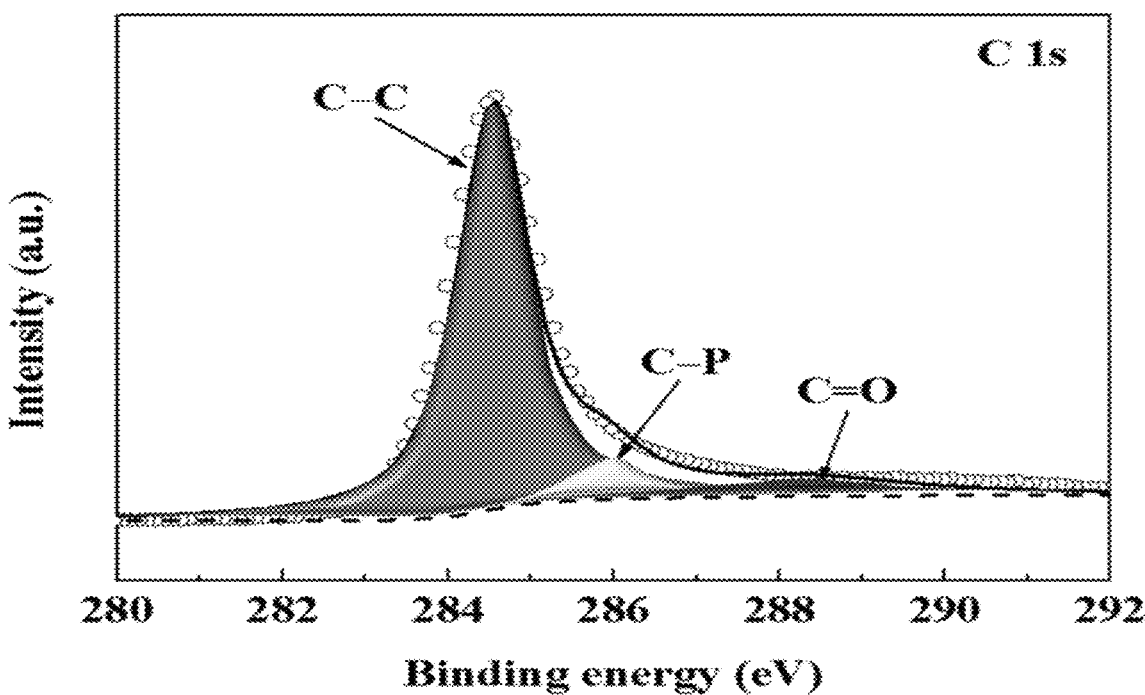
FIG. 8B is a graph showing an HR-XPS spectrum of C 1s.

FIG. 8B is a graph showing an HR-XPS spectrum of C 1s. It is possible to check valence and binding in more detail through the HR-XPS. That is, this is divided into three areas, i.e. a main peak due to a C—C bond at 284.6 eV and weak peaks showing C—P and C=O bonds at 285.8 eV and 288 .eV.

Figure 8C:
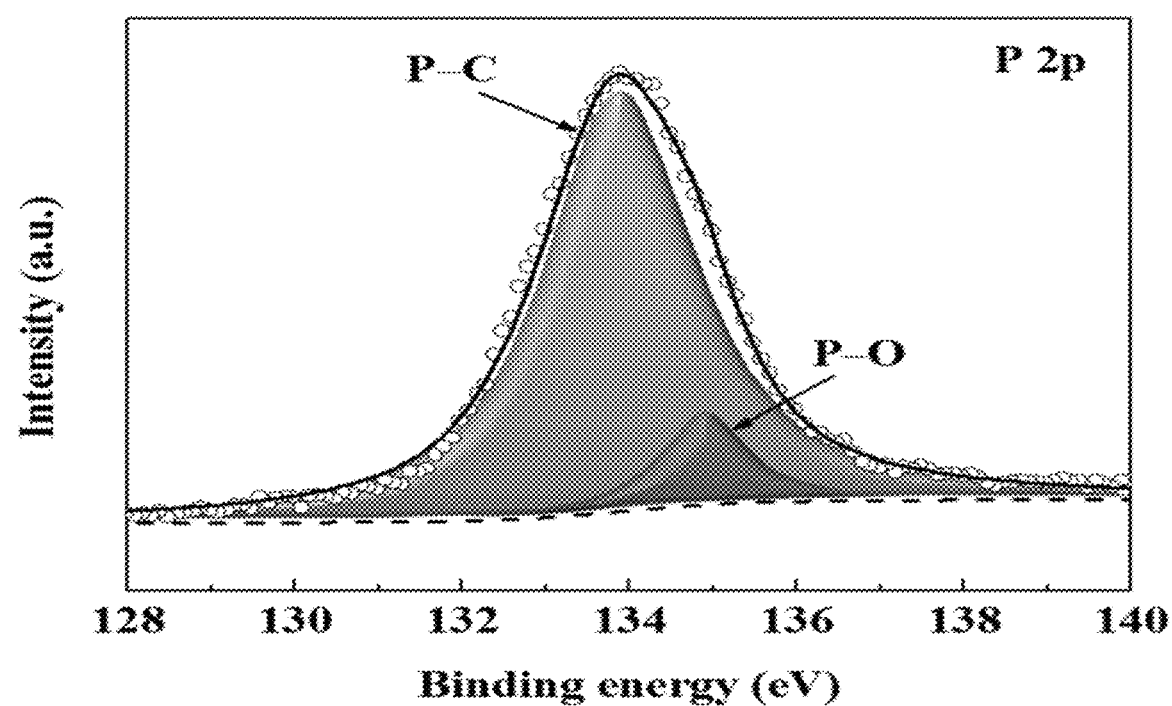
FIG. 8C is a graph showing an HR-XPS spectrum of P 2p.

FIG. 8C is a graph showing an HR-XPS spectrum of P 2p. A P 2p signal fitting curve may be divided into two areas at 133.8 eV and 134.8 eV, respectively, which is due to a P—C bond and a P—O bond, respectively. Particularly, the presence of the P—C peak shows that the P atom is bound to the carbon skeleton.

Meanwhile, since the radius of the P atom is larger than the radius of C and N atoms and thus the P atom requires high energy, it is difficult to occupy the position of the graphene layer. However, it can be seen that, since the PCB-500 has a relatively higher doping quantity of about 4 at %, the P atom is directly bound to three C atoms in most of dominant P—C bonds occupying 90% of the total area.

Thus, the PCB-500 according to the first embodiment may considerably increase and accelerate the sodium-ion storage capacity, because a difference between P and C atoms in bond length, atom diameter, and electro-negativity leads to more defects and more active sites in the carbon skeleton.

Figure 9A:
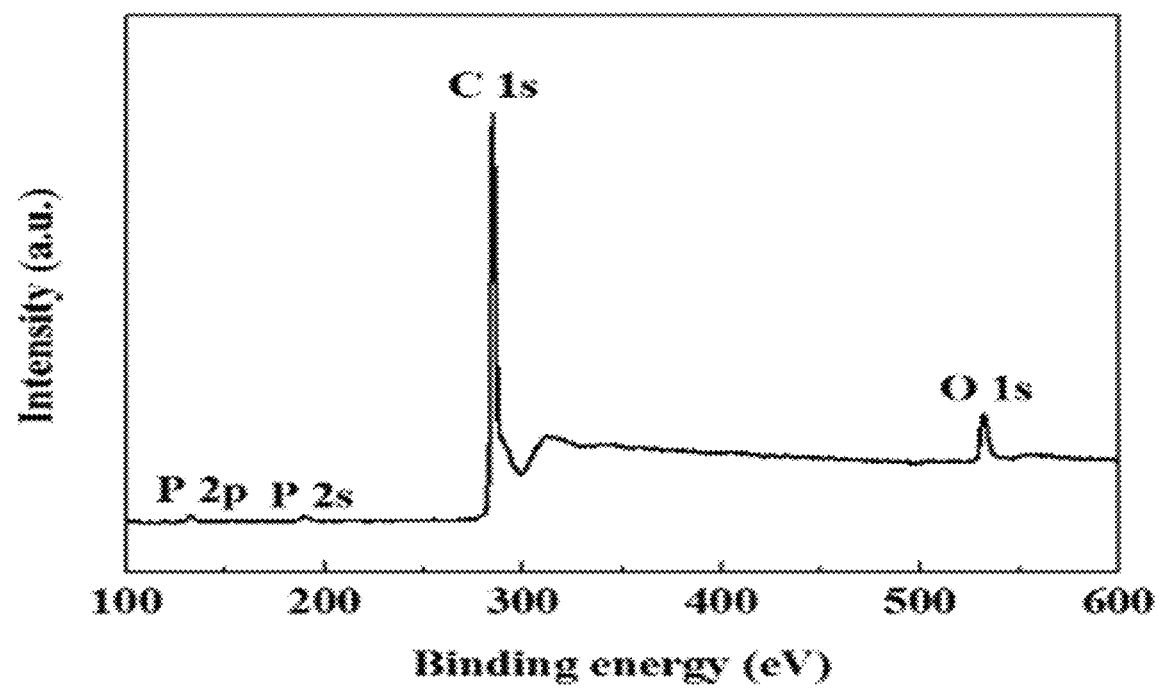
FIG. 9A is a graph showing an XPS spectrum of the phosphorus-doped porous carbon material according to the second embodiment.
Figure 9B:
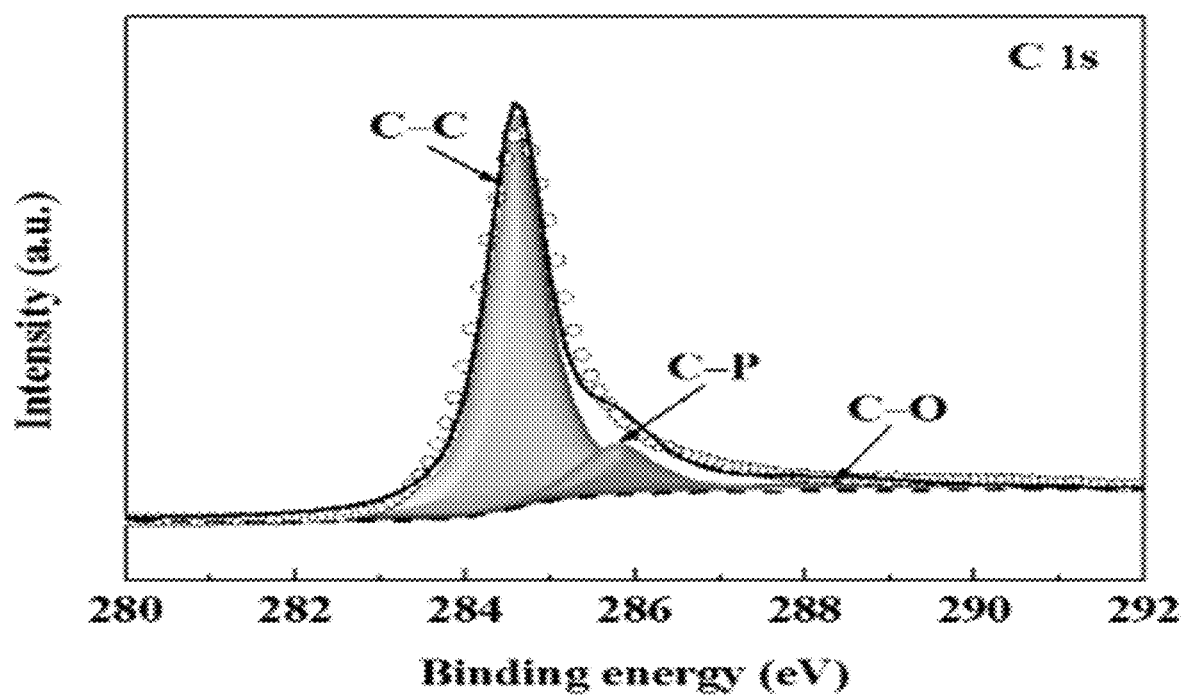
FIG. 9B is a graph showing an HR-XPS spectrum of C 1s.
Figure 9C:
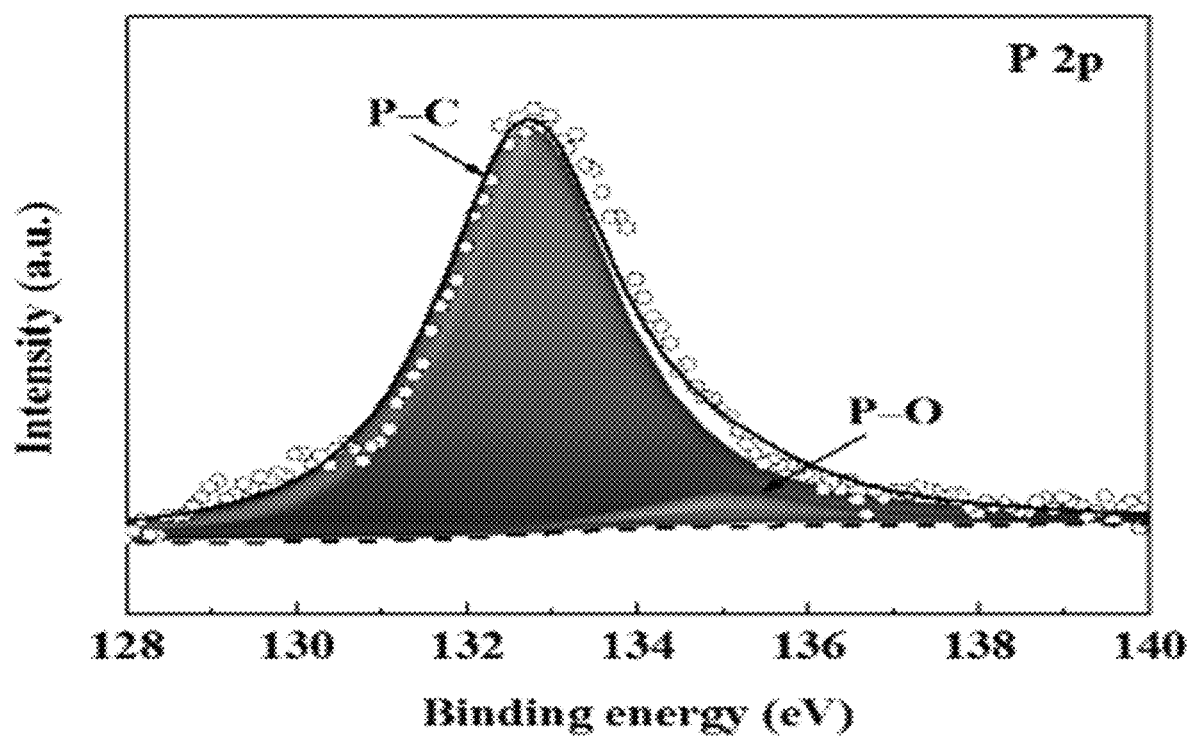
FIG. 9C is a graph showing an HR-XPS spectrum of P 2p.

FIG. 9A is a graph showing an XPS spectrum of the phosphorus-doped porous carbon material according to the second embodiment, FIG. 9B is a graph showing an HR-XPS spectrum of C 1s, and FIG. 9C is a graph showing an HR-XPS spectrum of P 2p. It can be seen that FIGS. 9A, 9B, and 9C show results similar to those of FIGS. 8A, 8B, and 8C.

Charge/Discharge Characteristic Test

The electrochemical performance of anode active material in a sodium-ion battery was first examined by cyclic voltammetry (CV) at the scan rate of 0.2 mV/s between 0.01 to 3.0V (V vs $Na^+/Na$).

Figure 10:
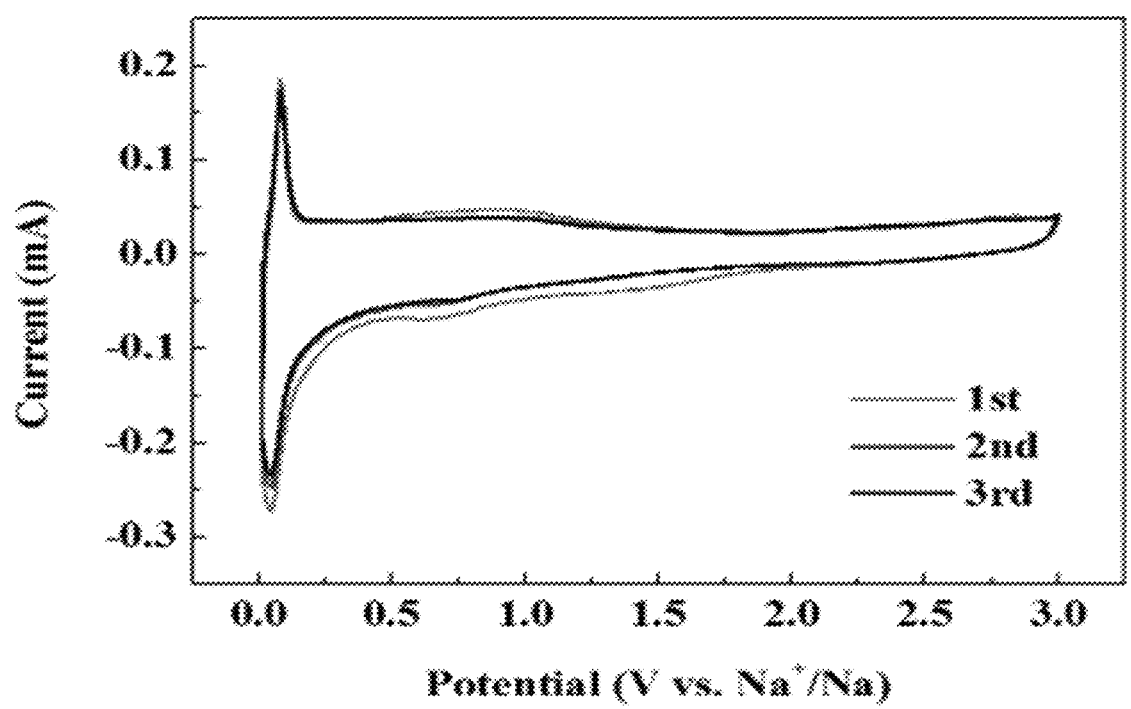
FIG. 10 is a graph showing a CV curve at the scan rate of 0.2 mV/s and 0.01 to 3.0V (V vs $Na^+$/Na) during the first three cycles of the phosphorus-doped porous carbon material according to the first embodiment.

FIG. 10 is a graph showing a CV curve at the scan rate of 0.2 mV/s and 0.01 to 3.0V (V vs $Na^+/Na$) during the first three cycles of the phosphorus-doped porous carbon material according to the first embodiment. As shown in FIG. 10, in the first cycle, an irreversible integral area is due to the formation of an SEI layer on a surface. However, it can be seen that the irreversible integral area is a portion where sodium ions are irreversibly inserted into bulk along with the formation of the thin and rigid SEI layer induced by an ether electrolyte.

Figure 11:
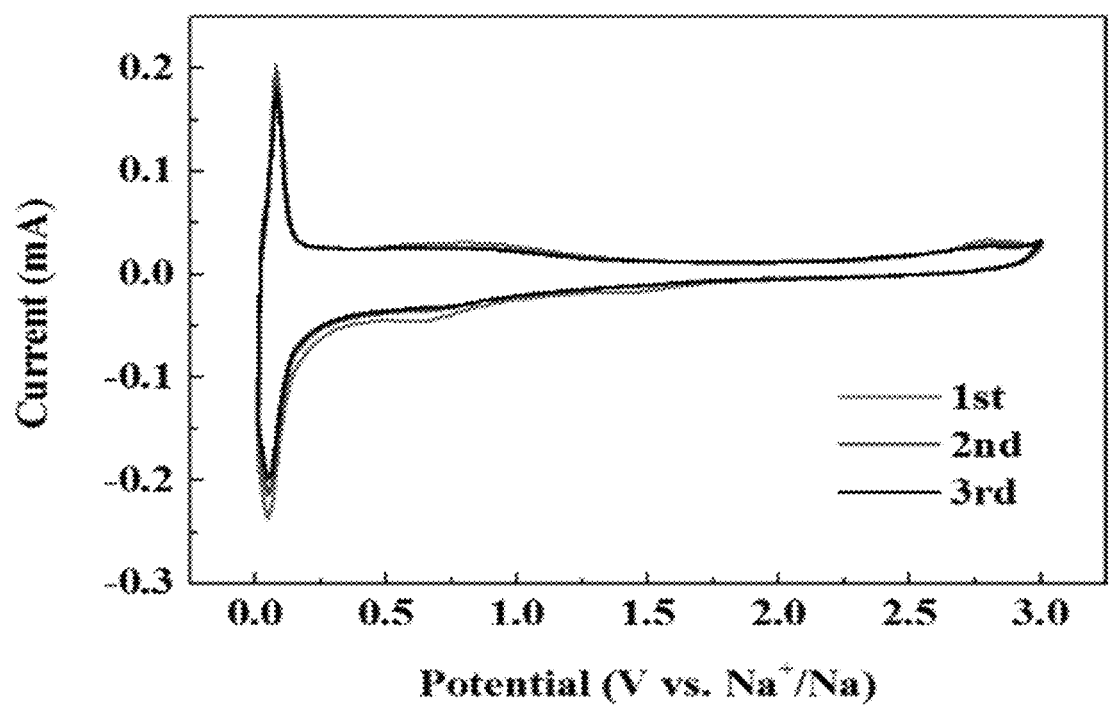
FIG. 11 is a graph showing a CV curve at the scan rate of 0.2 mV/s and 0.01 to 3.0V (V vs $Na^+$/Na) during the first three cycles of the phosphorus-doped porous carbon material according to the second embodiment.

FIG. 11 is a graph showing a CV curve at the scan rate of 0.2 mV/s and 0.01 to 3.0V (V vs $Na^+/Na$) during the first three cycles of the phosphorus-doped porous carbon material according to the second embodiment. Referring to FIG. 11, it can be seen that the heat-treatment temperature is higher and the specific surface area is large, but the irreversible integral areas of the first and second cycles are smaller and almost overlap each other.

When comparing the irreversible integral areas in the CV curves of FIGS. 10 and 11, it can be seen that the sodium ions are irreversibly inserted into the amorphous non-crystalline area of carbon having defects caused by doping the irreversible integral area of the first cycle with phosphorus.

After the first cycle, since the CV curve almost overlaps both the PCB-500 and the PCB-1000, this means that the reversibility of the sodium-ion battery and the cycling stability are excellent.

Meanwhile, both the PCB-500 and the PCB-1000 shows a pair of sharp reduction peaks in a low potential less than 0.1V. This means the insertion-extraction reaction of sodium ions in the graphene layer. In a potential more than 0.1V, a square is observed. This means that the capacitive adsorption-desorption of sodium ions occurs.

Figure 12:
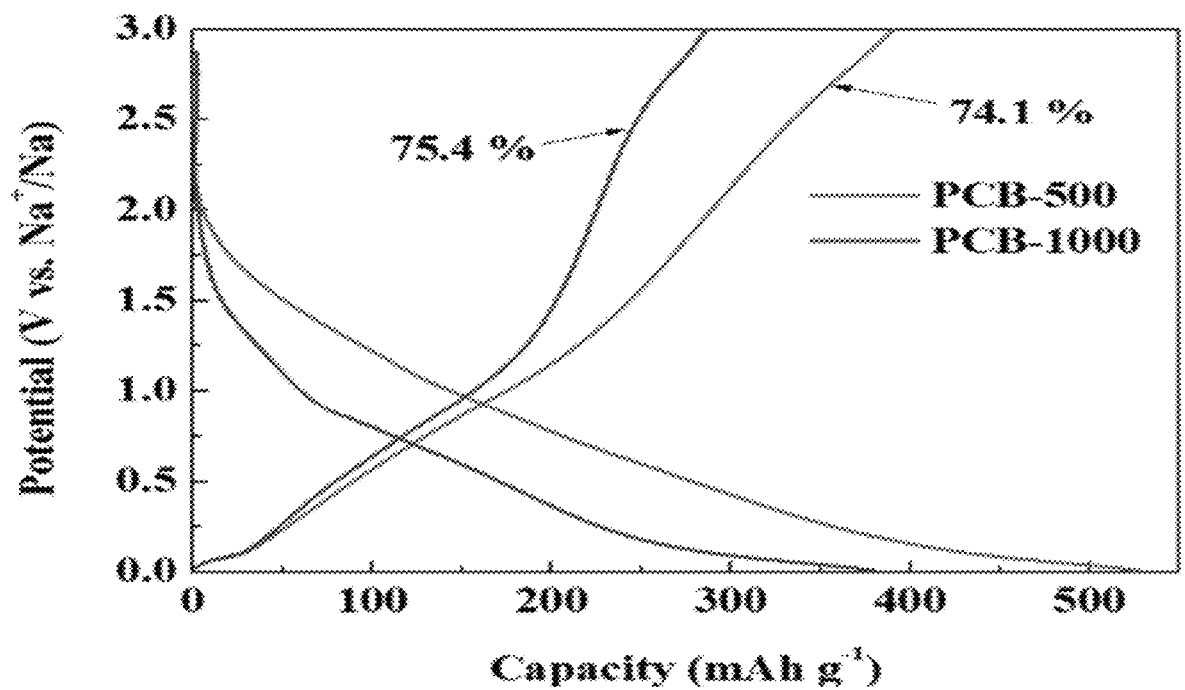
FIG. 12 is a graph showing a charge/discharge profile during the first cycle at a current density of 0.5 A/g and 0.01 to 3.0V (V vs $Na^+$/Na) of the phosphorus-doped porous carbon materials according to the first and second embodiments.

FIG. 12 is a graph showing a charge/discharge profile during the first cycle at a current density of 0.5 A/g and 0.01 to 3.0V (V vs $Na^+/Na$) of the phosphorus-doped porous carbon materials according to the first and second embodiments.

Referring to FIG. 12, it can be seen that the initial Coulombic efficiency of the PCB-500 exhibits a high value of 74.1% and the initial Coulombic efficiency of the PCB-1000 exhibits a high value of 75.4%, to correspond to the CV curve. Even if the PCB-1000 has a larger specific surface area, the more crystallized structure reduces the irreversible insertion of sodium ions in the amorphous area. This shows a higher initial Coulombic efficiency value.

Meanwhile, the formation of the SEI layer on the surface was confirmed through Electrochemical Impedance Spectroscopy (EIS).

Figure 13:
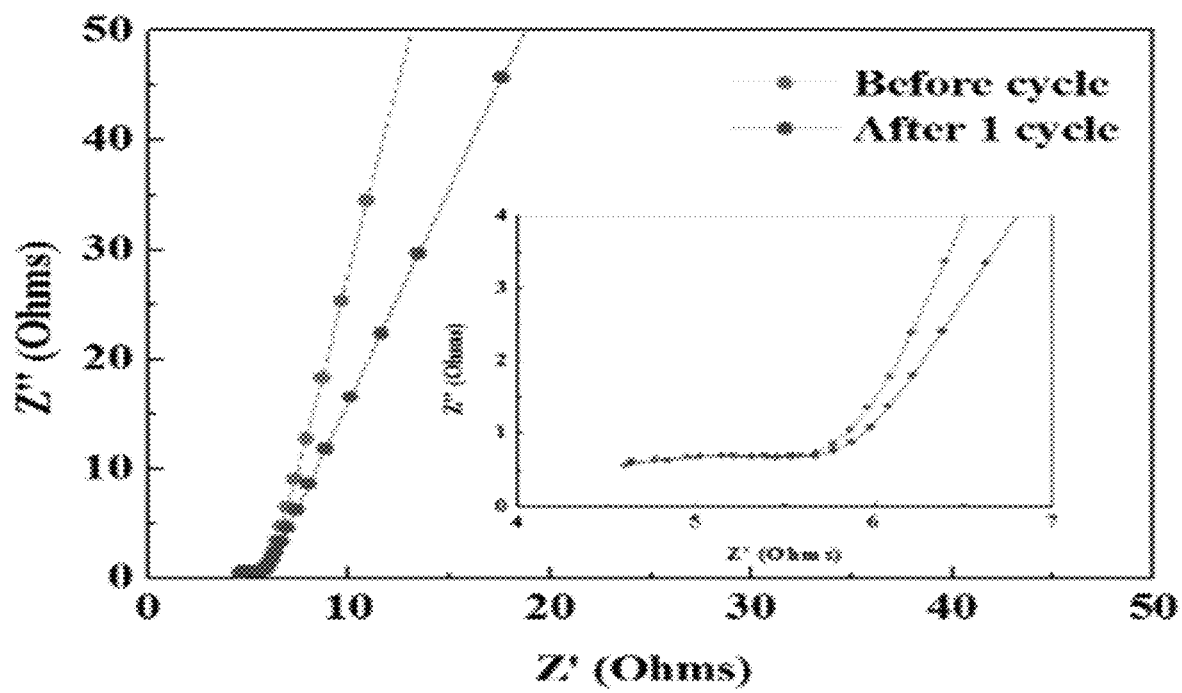
FIG. 13 is a graph showing an EIS spectrum before and after one cycle of the phosphorus-doped porous carbon material according to the first embodiment.

FIG. 13 is a graph showing an EIS spectrum before and after one cycle of the phosphorus-doped porous carbon material according to the first embodiment. FIG. 13 shows that the SEI layer is formed very thinly and rigidly, because an interface charge transfer resistance rarely changes after the SEI layer is formed. This is supported by the CV result. In other words, the formation of the thin and rigid SEI layer does not only suppress the loss of the active material, but also promotes the movement of sodium ions and provides a high-speed performance. Further, this stabilizes a carbon structure, and provides excellent cycling stability.

Figure 14:
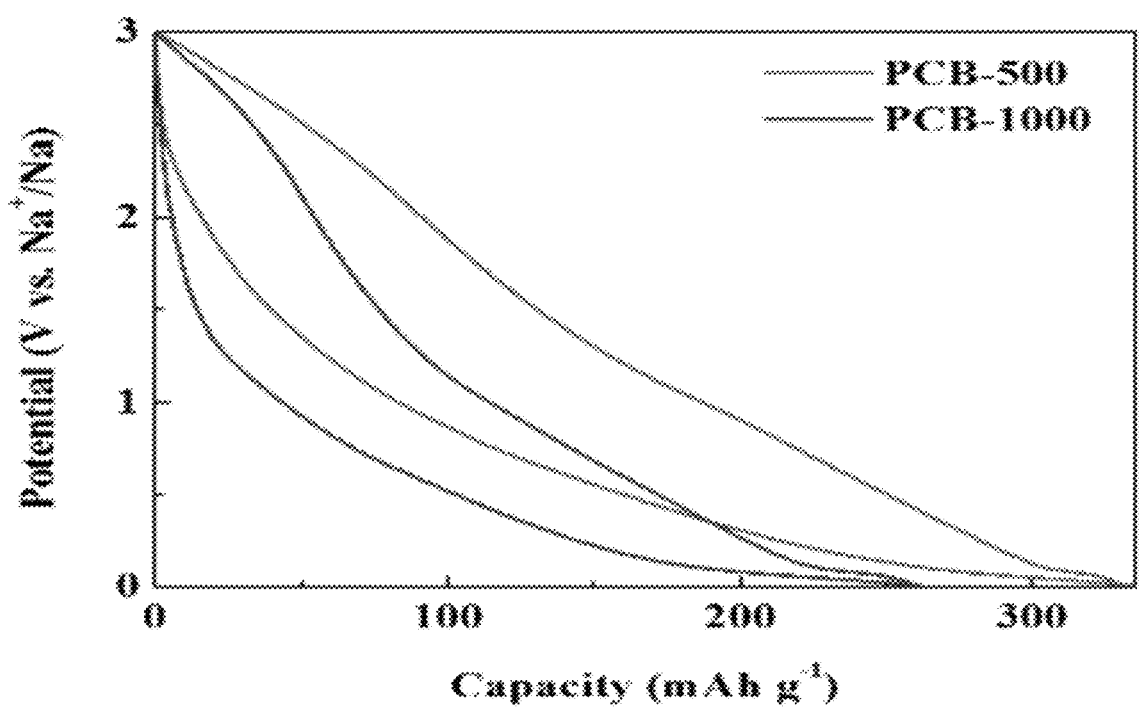
FIG. 14 is a graph showing a charge/discharge profile at the fifth cycle at 1 A/g current density of the phosphorus-doped porous carbon material according to the first and second embodiments.

FIG. 14 is a graph showing a charge/discharge profile at the fifth cycle at 1 A/g current density of the phosphorus-doped porous carbon material according to the first and second embodiments. Referring to FIG. 14, this corresponds to the CV curve, and the PCB-500 and the PCB-1000 are distinguished into charge/discharge profiles each having a slope area and a plateau area due to the sodium-ion insertion-extraction reaction below 0.1V, and the sodium-ion capacitive adsorption-desorption above 0.1V.

Figure 15:
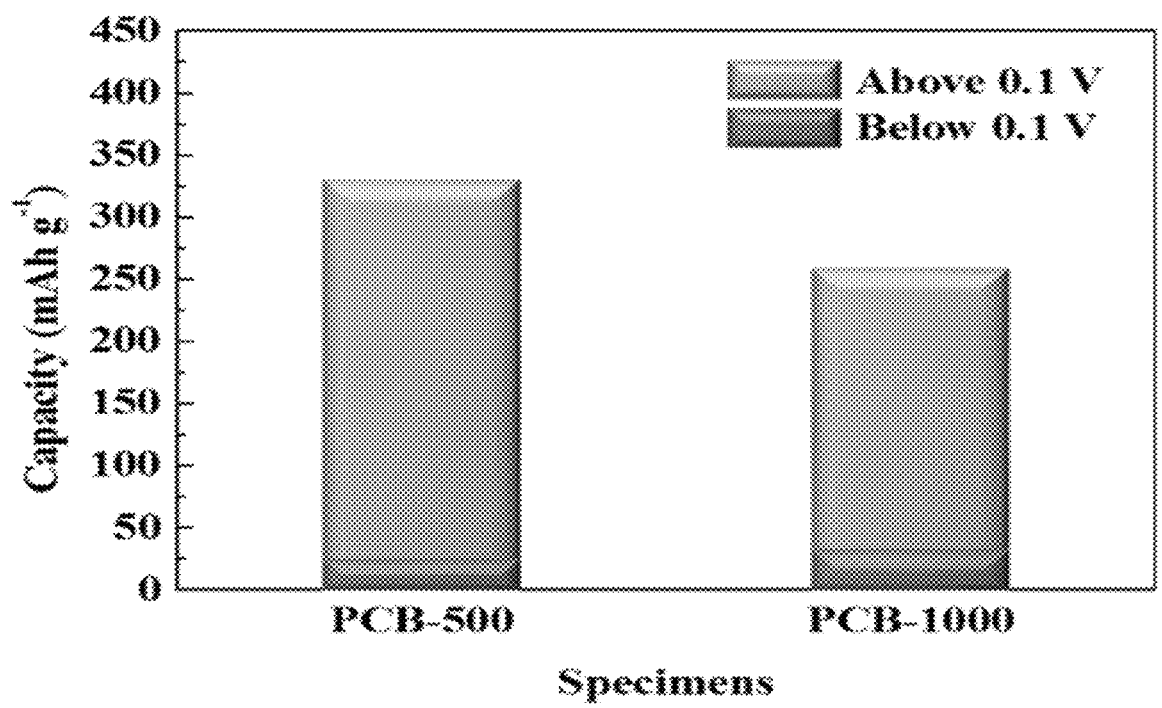
FIG. 15 is a graph showing capacities above and below 0.1V of the phosphorus-doped porous carbon material according to the first and second embodiments during the fifth cycle at the 1 A/g current density of FIG. 14.

FIG. 15 is a graph showing capacities above and below 0.1V of the phosphorus-doped porous carbon material according to the first and second embodiments during the fifth cycle at the 1 A/g current density of FIG. 14. That is, FIG. 15 is the graph showing the charge capacity ratios of the PCB-500 and PCB-1000 for each area of FIG. 14. As the heat-treatment temperature becomes high, crystallization increases. Thus, in the case of the PCB-500, the capacity of the plateau area increases below 0.1V at 24 mAh/g. In the case of the PCB-1000, the capacity of the plateau area increases below 0.1V at 31 mAh/g. However, the capacity of the slope area above 0.1V is significantly reduced from 306 mAh/g to 229 mAh/g. The high capacitive adsorption-desorption ratio of the PCB-500 means that more active sites are present by both the phosphorus doping and the amorphous structure.

Figure 16:
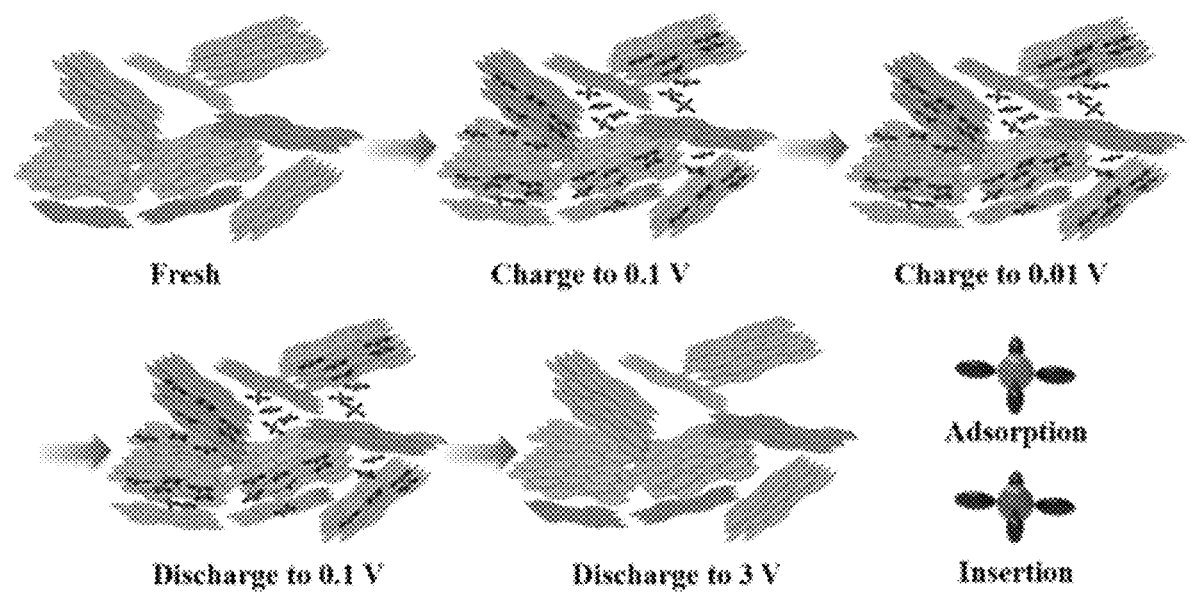
FIG. 16 is a schematic view showing a sodium-ion storing process of the phosphorus-doped porous carbon material according to the first embodiment.

FIG. 16 is a schematic view showing a sodium-ion storing process of the phosphorus-doped porous carbon material according to the first embodiment. Referring to FIG. 16, it is possible to check a sodium-ion storage mechanism based on the CV curve and the charge/discharge profile. A whole charging process is adsorption and storage in a defect and a nano-pore except for the insertion and storage of some graphene sheets at a low potential below 0.1V, and is almost restored to its initial state when discharged to 3.0V in a next discharge process.

Figure 17:
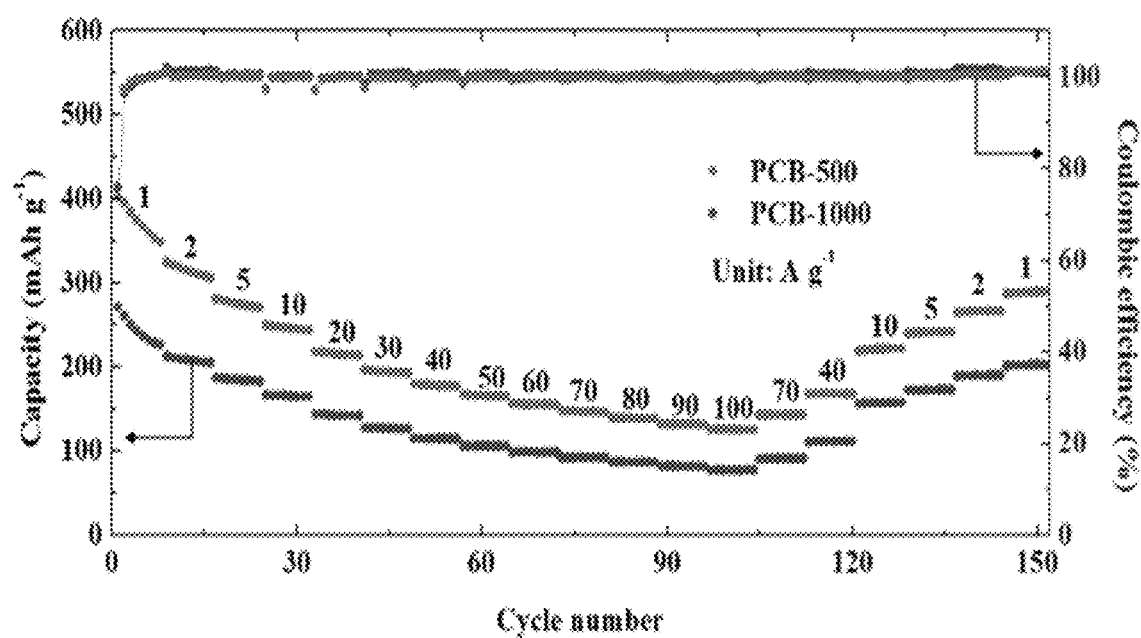
FIG. 17 is a graph showing the speed performance of the phosphorus-doped porous carbon materials according to the first and second embodiments.

FIG. 17 is a graph showing the speed performance of the phosphorus-doped porous carbon materials according to the first and second embodiments. In FIG. 17, the speed performance of the PCB-500 and the PCB-1000 may be checked, and it can be seen that the PCB-500 shows more excellent speed performance than the PCB-1000 at various current densities of 1 to 100 A/g. The PCB-500 shows the reversible capacity of 375, 316, 276, 246, 216, 194, 178, 166, 155, 146, 139, 132, and 125 mA/g in the current density of 1, 2, 5, 10, 20, 30, 40, 50, 60, 70, 80, 90, and 100 A/g. Further, this shows Coulombic efficiency converging on 100%. When the current density is controlled to 70, 40, 10, 5, 2, and 1 A/g, the reversible capacity is completely restored, thus showing very stable reversibility and cycling performance.

Figure 18:
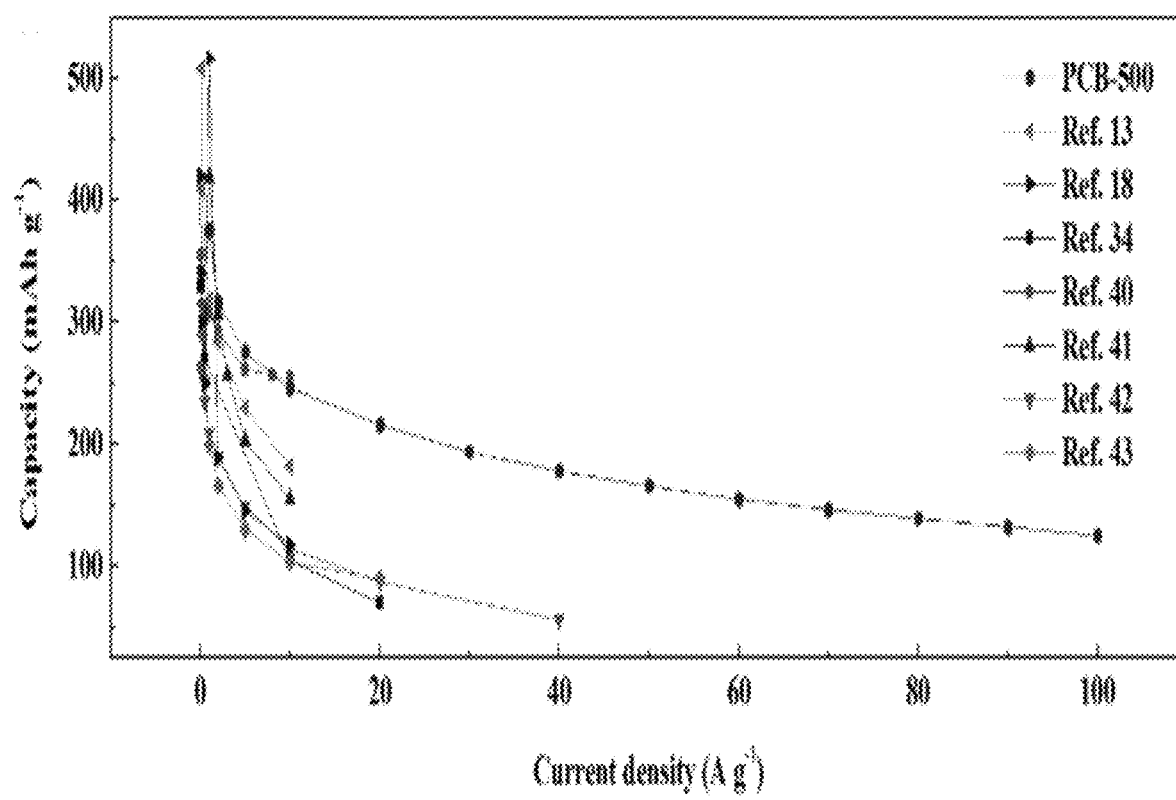
FIG. 18 is a graph showing comparison between a conventional carbon material and the phosphorus-doped porous carbon material according to the first embodiment.

FIG. 18 is a graph showing comparison between a conventional carbon material and the phosphorus-doped porous carbon material according to the first embodiment. This shows comparison between the reversible capacity of commercially available random heteroatom doping carbon (Ref.13, Ref.18, Ref.34, Ref.40, Ref.41, Ref.42, Ref.43) and the reversible capacity of PCB-500 at the super-current density of 100 A/g.

In FIG. 18, the conventional heteroatom doping carbon may increase the current density up to 40 A/g, whereas the PCB-500 according to the first embodiment may provide a sufficient reversible capacity even if the current density increases to the super-current density of 100 A/g. Thus, it can be seen that the speed performance of the PCB-500 is excellent. The excellent speed performance of the PCB-500 is due to more meso-macro pores and more active sites.

Figure 19:
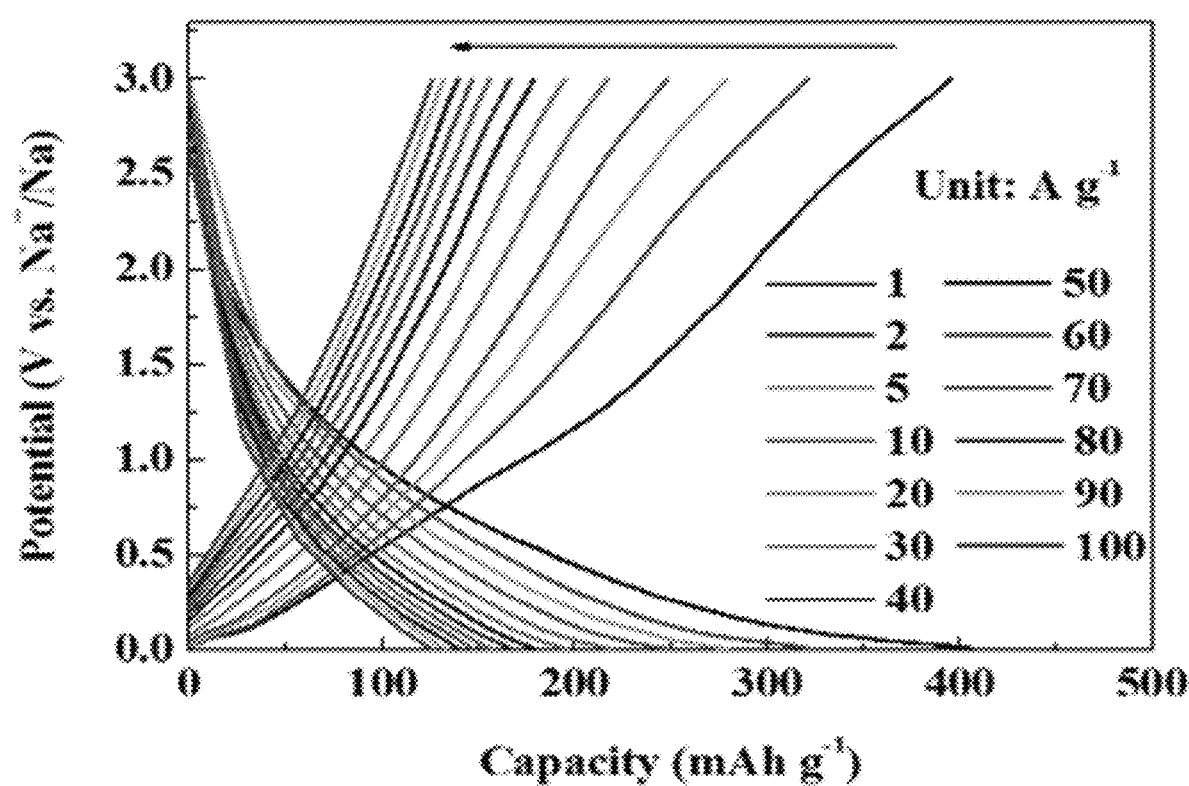
FIG. 19 is a graph showing a charge/discharge profile for the current density.

FIG. 19 is a graph showing a charge/discharge profile for the current density. The result of FIG. 18 may be described through FIG. 19. As the current density increases, a stagnation area is rapidly reduced, so that the sodium-ion adsorption reaction in the active site is much faster than the insertion reaction in the graphene layer. In other words, the meso-macro pore reduces the diffusion distance of sodium ions. This is advantageous to rapidly diffuse the sodium ions, and more active sites may provide a sufficient space for storing more sodium ions.

Figure 20A:
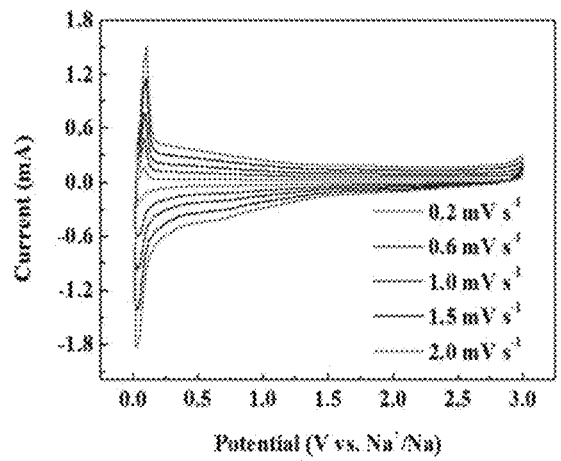
FIG. 20A is a graph showing a CV curve of the phosphorus-doped porous carbon material according to the first embodiment at different scan rates of 0.2 to 2.0 mV/s.

FIG. 20A is a graph showing a CV curve of the phosphorus-doped porous carbon material according to the first embodiment at different scan rates of 0.2 to 2.0 mV/s. That is, in order to confirm the excellent speed performance of the PCB-500 according to the first embodiment, kinetics were confirmed by performing the CV at different scan rates ranging from 0.2 to 2.0 mV/s.

As the scan rate increases, the peak current gradually increases but the shape of the CV curve is maintained, so that a capacitive behavior may appear. This result may be calculated by the following Equation 1 between the scan rate and the peak current.

$$I=av^b \quad \text{[Equation 1]}$$

where a and b represent correlation coefficients, and v represents a scan rate. A b value b close to 0.5 means a diffusion control process. If the b value is close to 0.1, this means a surface control process.

Figure 20B:
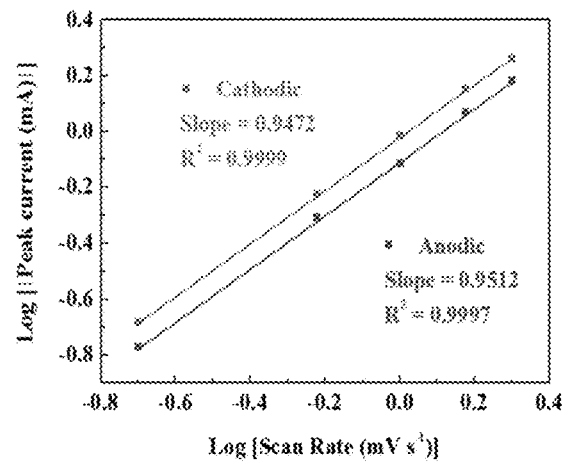
FIG. 20B is a graph showing a linear relationship between the log of a peak current and the log of scan rate of the phosphorus-doped porous carbon material according to the first embodiment.

In FIG. 20B that is a graph showing a linear relationship between the log of a peak current and the log of scan rate of the phosphorus-doped porous carbon material according to the first embodiment, the b values of anodic and cathodic peaks of the PCB-500 are 0.9472 and 0.9512, respectively. This means that dynamics are mainly controlled by a surface control process.

The relative contribution of the insertion and capacity process at a fixed potential may be calculated from the following Equation 2.

$$I(V)=k_1v+k_2v^{1/2} \quad \text{[Equation 2]}$$

$k_1v$ and $k_2v^{1/2}$ represent intercalation and the contribution of the capacitive process.

Figure 20C:
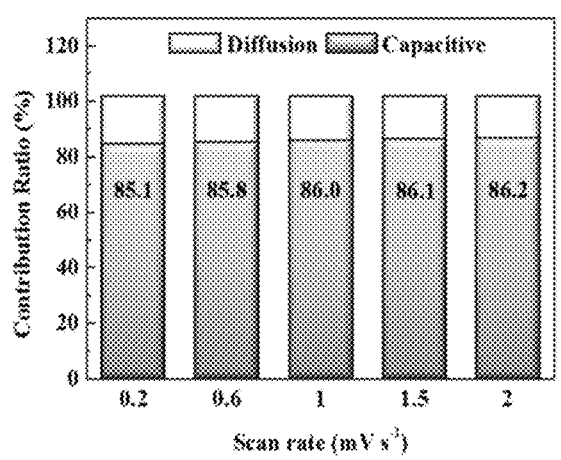
FIG. 20C is a graph showing a capacitive contribution ratio corresponding to a total capacity.
Figure 20D:
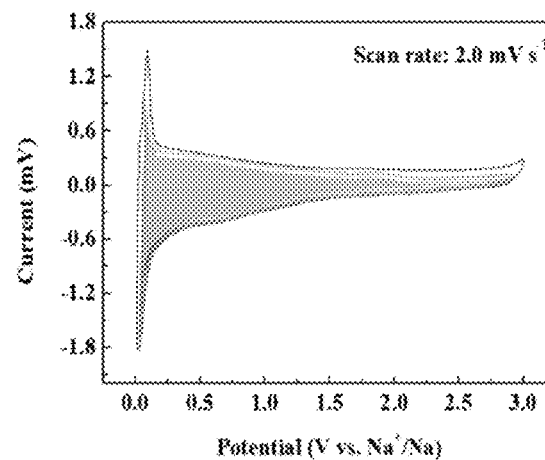
FIG. 20D is a graph showing a CV curve of the phosphorus-doped porous carbon material according to the first embodiment at the scan rate of 2.0 mV and a capacitive contribution relationship.

FIG. 20C is a graph showing a capacitive contribution ratio corresponding to a total capacity. As shown in FIG. 20C, the contribution of the capacitive process of the PCB-500 at 2.0 mV/s is about 86%, and this contribution is 85% or more at various scan rates of 0.2 to 2.0 mV/s, and increases depending on the scan rate, as shown in FIG. 20D that is a graph showing a CV curve of the phosphorus-doped porous carbon material according to the first embodiment at the scan rate of 2.0 mV and a capacitive contribution relationship.

These results show that most of the capacity of the PCB-500 originates from a fast capacitance process, which confirms that a super-high speed performance condition is satisfied.

Cycling Performance Characteristic Test Depending on Current Density

The cycling performance characteristics of the PCB-500 and the PCB-1000 were further analyzed depending on various current densities.

FIGS. 21A to 21D are graphs showing the cycling performance of the phosphorus-doped porous carbon materials according to the first and second embodiments at different discharge current densities.

Figure 21A:
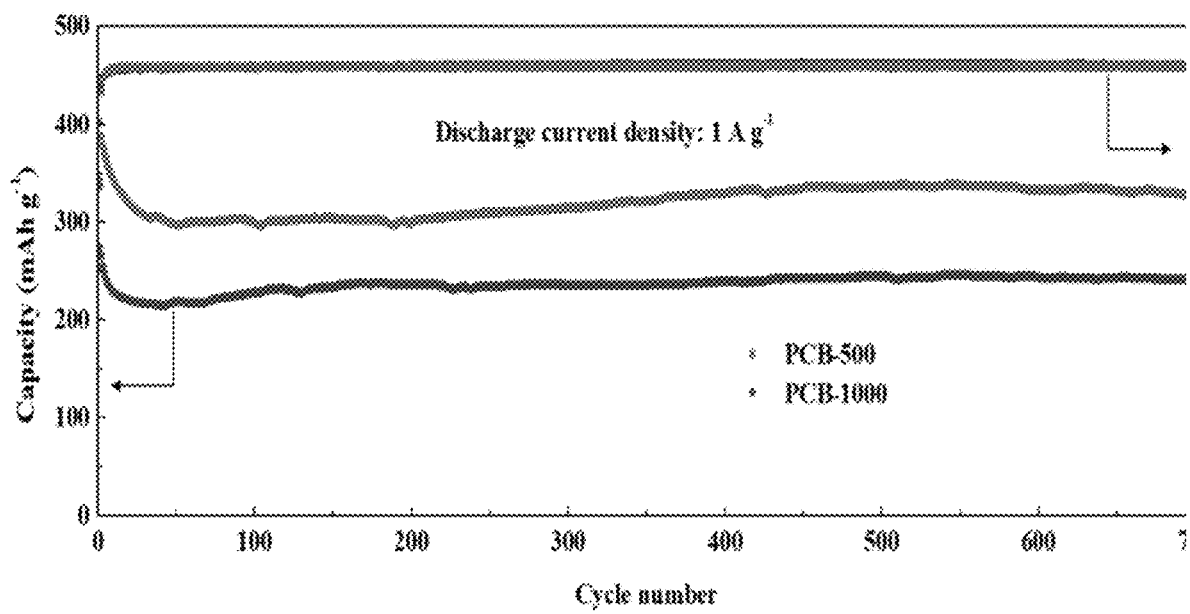
FIGS. 21A to 21D are graphs showing the cycling performance of the phosphorus-doped porous carbon materials according to the first and second embodiments at different discharge current densities.

Referring to FIG. 21A, the cycling performance of each of the PCB-500 and the PCB-1000 at the current density of 1 A/g can be confirmed. Both the PCB-500 and the PCB-1000 are stabilized after initial fading, and exhibit very high cycling stability. Meanwhile, the Coulombic efficiency thereof converges on 100% over 700 cycles.

Meanwhile, the reversible capacity increases for both the PCB-500 and the PCB-1000. This may be due to the morphology defects of the amorphous non-crystalline structure. The reversible capacity of the PCB-500 increases up to continuous 500 cycles, and reaches 340 mAh/g in 700 cycles. After the reversible capacity of the PCB-1000 increases during the first 200 cycles, the reversible capacity of 245 mAh/g is confirmed in 700 cycles. This difference is due to the crystallization quantity depending on the heat-treatment temperature. Since the PCB-500 has active sites more than the PCB-1000, the reversible capacity is higher.

Figure 21B:
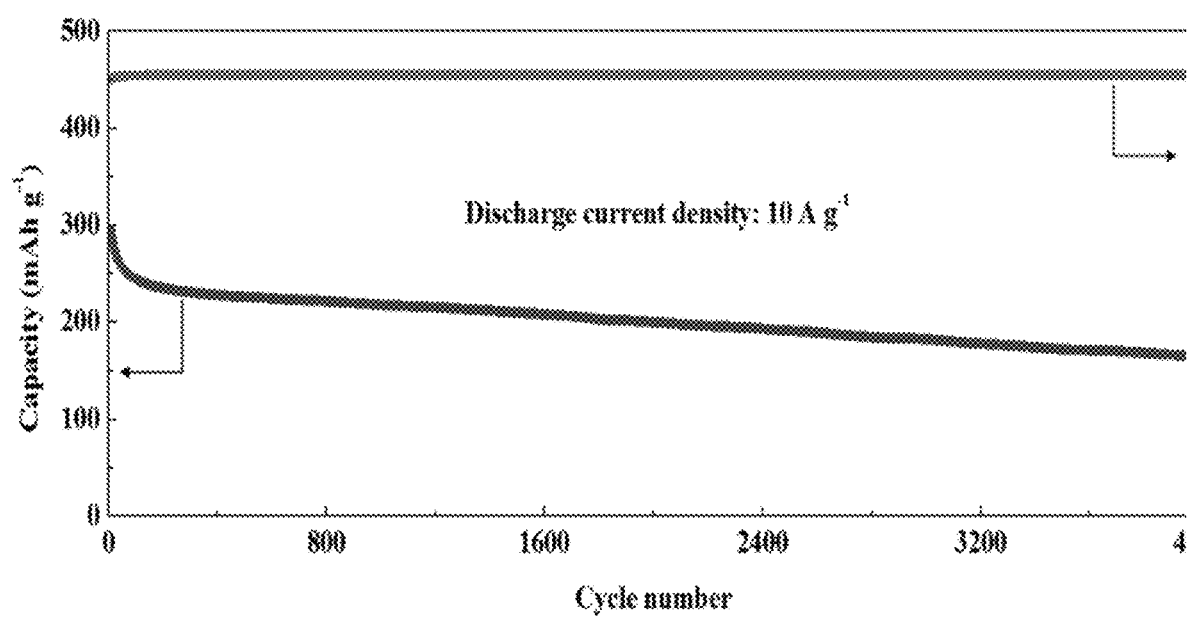
Figure 21C:
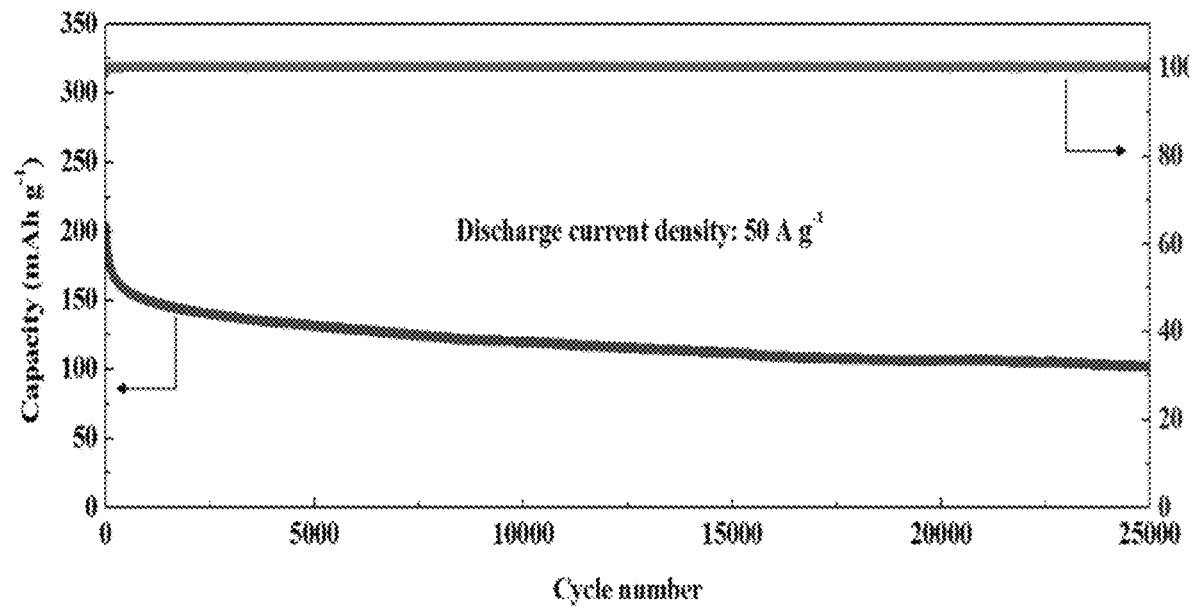
Figure 21D:
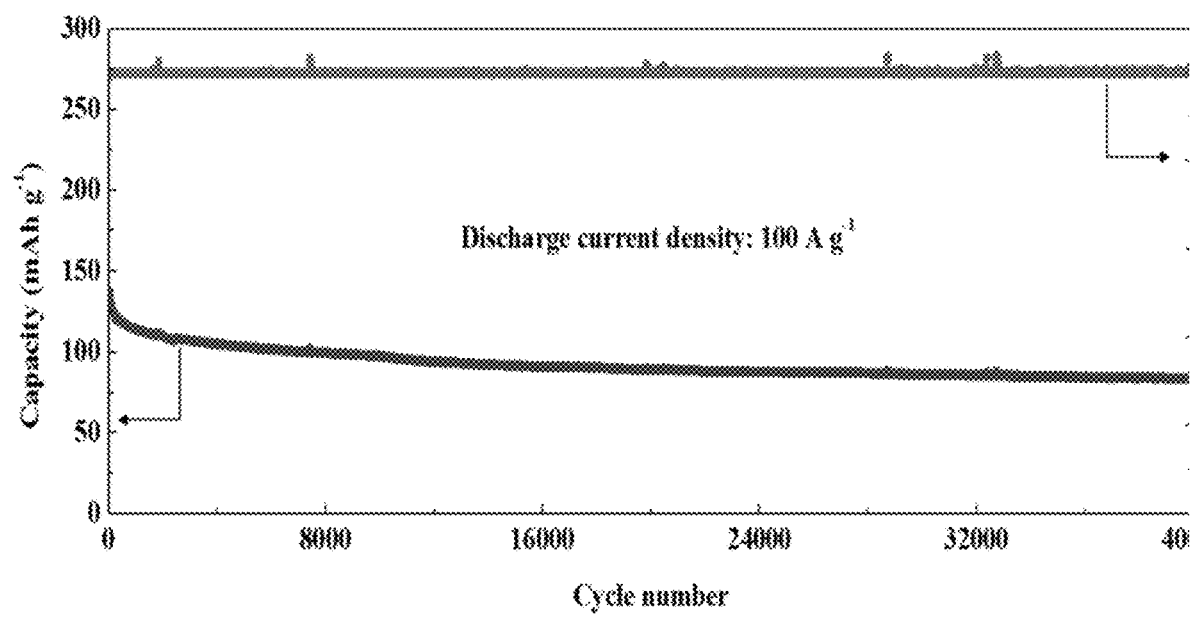

FIG. 21B shows the cycling performance of the PCB-500 at the current density of 10 A/g, FIG. 21C shows the cycling performance of the PCB-500 at the current density of 50 A/g, and FIG. 21D shows the cycling performance of the PCB-500 at the current density of 100 A/g.

It is possible to achieve both excellent storage capacity and high cycling stability at a super-current density. In FIGS. 21B and 21D, considerable reversible capacities of 165 and 83 mAh/g were maintained even after 4,000 and 40,000 cycles.

It can be confirmed that the excellent electrochemical performance is due to the following factors. First, the ether electrolyte forms a very thin and rigid SEI layer to induce high initial Coulombic efficiency, fast transport of sodium ions, and excellent cycling stability. Second, an active site for storing a large quantity of sodium ions is provided by the doping of a large quantity of phosphorus amounting to 4% of the phosphorus-doped porous carbon material and the disordered amorphous non-crystalline structure. Third, a meso-macro hierarchical pore structure enables efficient electrolyte penetration, allows sodium ions to be rapidly diffused, and provides a buffer for accommodating a change in volume during cycling, thus improving structural stability and cycle performance.

Second Test Example

In this test example, the material characteristics and the electrochemical characteristics of the platinum-doping porous carbon material with the aggregated platinum-doping carbon nanoparticles manufactured according to the third embodiment were tested.

Figure 22A:
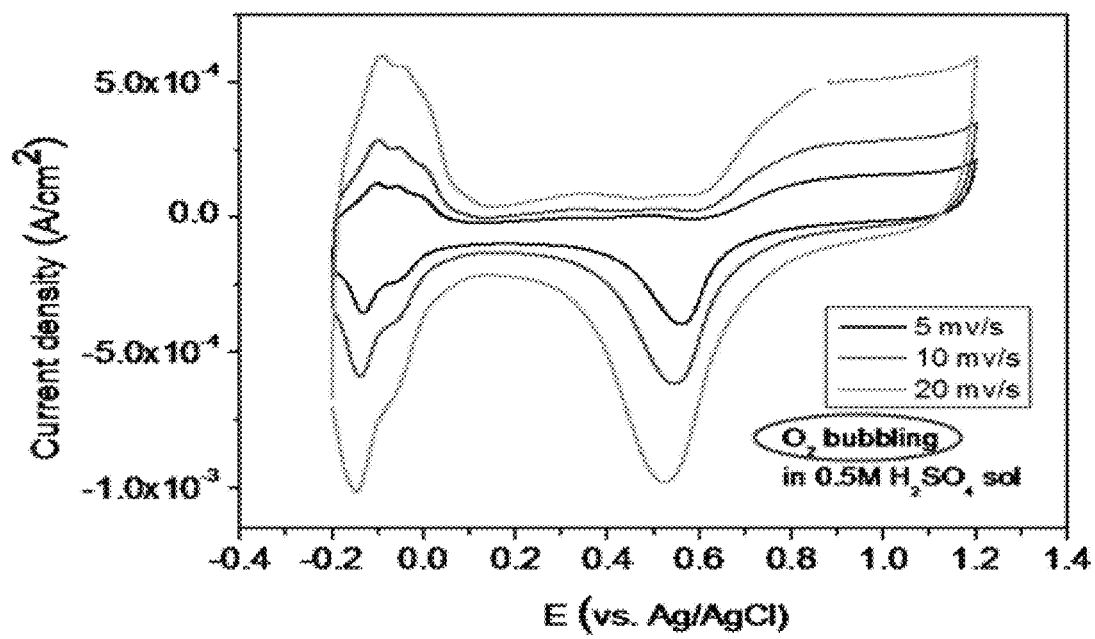
FIG. 22A is a graph showing a current density-electric field curve of a platinum-doping porous carbon material according to a third embodiment.
Figure 22B:
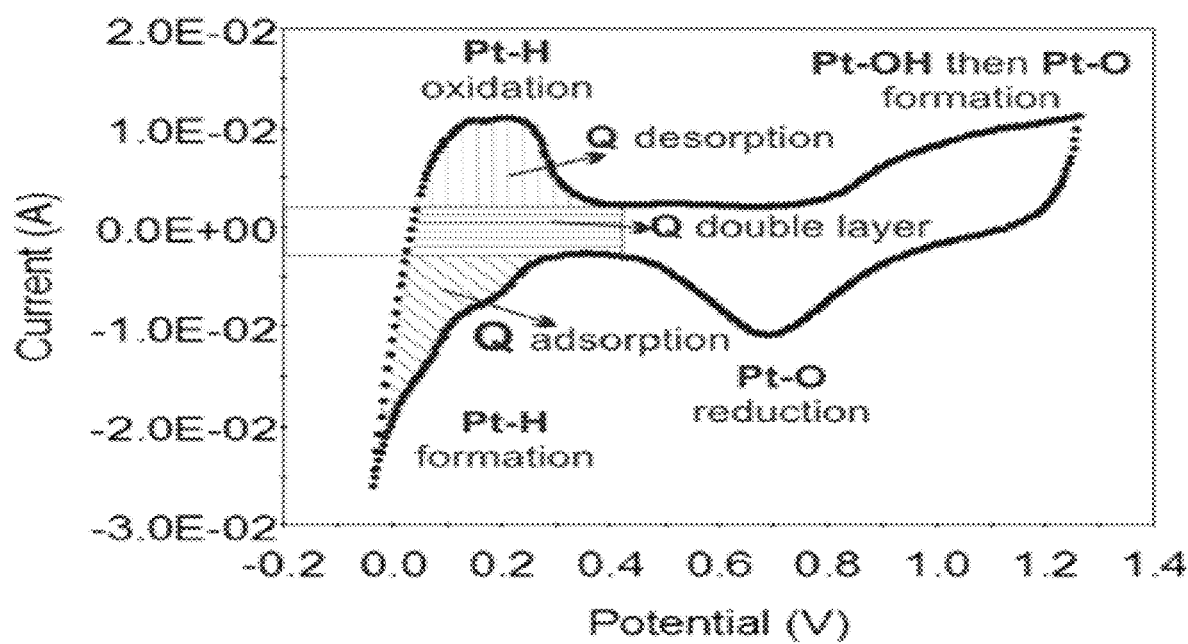
FIG. 22B is a graph showing a peak analysis of a platinum CV curve.

FIG. 22A is a graph showing a current density-electric field curve of a platinum-doping porous carbon material according to a third embodiment. Referring to FIG. 22A, a process of melting Tetrakis(triphenylphosphine)platinum(0) is performed and then a solution plasma process is performed to form the platinum-doping porous carbon material. The cyclic voltammetry of the carbon material is measured, so that a redox ability for oxygen and hydrogen of platinum can be confirmed. Thereby, it can be seen that the redox ability for oxygen and hydrogen of platinum doped onto carbon is excellent. FIG. 22B is a graph showing a peak analysis of a platinum CV curve. FIG. 22B shows excellent oxidation and reduction peaks for oxygen and hydrogen in FIG. 22A.

Based on the results of the embodiments and test examples, the present disclosure relates to the method for manufacturing the porous carbon material doped with the heterogeneous element and the porous carbon material doped with the heterogeneous element prepared using the method. According to the related art, the synthesis process is limited to the liquid phase at room temperature. However, according to the present disclosure, the process is extended to a solid phase. Further, after a pair of metal wires is disposed in the precursor melt prepared by melting the carbon precursor powder containing one or more kinds of heterogeneous elements selected from metal and nonmetal, power is applied to the metal wires to perform plasma discharge, so that the carbon nanoparticles doped with the heterogeneous element while having the micropores are formed and aggregated, thus forming the porous carbon material having the meso-macro hierarchical pore structure. As the heterogeneous element is bound to carbon of the carbon precursor, the carbon nanoparticle is formed in the amorphous structure while being doped with the heterogeneous element, thus increasing the active site.

Particularly, it is possible to provide high initial Coulombic efficiency of about 75% and a high reversible capacity of 340 mAh/g at the current density of 1 A/g. Further, after 40,000 cycles even at the super-current density of 100 A/g, the speed performance of 130 mA/g and the reversible capacity of 83 mAh/g can provide cycling stability.

Therefore, the present disclosure provides a very efficient approach to the heterogeneous-element doping. That is, carbon precursor powder containing a heterogeneous element present in a solid powder state at room temperature is melted to prepare a precursor melt, and then only the precursor melt is subjected to a solution plasma process, thus synthesizing a porous carbon material having an increased active site due to defects caused by the heterogeneous-element doping, i.e. an amorphous structure while having micropores, mesopores, and macropores. Consequently, the present disclosure is expected to be actively applied to and utilized in a next-generation energy storage device having high power and energy density.

While the present disclosure has been described with reference to preferred embodiments, it is apparent to those skilled in the art that these embodiments have been described for illustrative purposes, and various changes and modifications may be made without departing from the spirit and scope of the present disclosure as defined by the appended claims. Accordingly, the embodiments disclosed herein are intended to illustrate the technical idea of the present disclosure without limiting the technical idea, and the scope of the technical idea of the present disclosure is not limited by these embodiments. The protection scope of the present disclosure should be interpreted by the claims, and all technical ideas within the scope equivalent thereto should be construed as being included in the scope of the present disclosure.

What is claimed is:

1. A method for manufacturing a porous carbon material doped with a heterogeneous element, the method comprising:
   heat treating carbon precursor powder at a temperature between 75° C. and 95° C., wherein the carbon precursor powder contains one or more kinds of heterogeneous elements selected from metal and nonmetal to prepare a precursor melt;
   disposing a pair of metal wires in the precursor melt; and
   applying bipolar pulsed direct current power to the metal wires to perform plasma-discharge, wherein the bipolar pulsed direct current power has a pulse width of 0.1 to 3 μs, a frequency of 80 to 150 KHz and a voltage of 1.0 to 5.0 KV, thus forming and aggregating carbon nanoparticles doped with the one or more kinds of heterogeneous elements to form the porous carbon material of a size between 20 nm to 40 nm, wherein the porous carbon material has a meso-macro hierarchical pore structure providing a BET specific surface area of 200 to 400 $m^2/g$.

2. The method of claim 1, further comprising:
   heat-treating the porous carbon material at 500 to 1,000° C.

3. The method of claim 1, wherein a heterogeneous-element doping quantity for the porous carbon material is in a range of 1 to 10 at %.

4. The method of claim 1, wherein the metal of the heterogeneous element comprises one or more selected from a group consisting of platinum (Pt), palladium (Pd), gold (Au), ruthenium (Ru), iridium (Ir), tin (Sn), aluminum (Al), lithium (Li), sodium (Na), copper (Cu), zinc (Zn), magnesium (Mg), cobalt (Co), manganese (Mn), nickel (Ni), and iron (Fe), and the nonmetal comprises one or more selected from a group consisting of phosphorus (P), sulfur (S), selenium (Se), boron (B), nitrogen (N), and silicon (Si).

5. A porous carbon material doped with a heterogeneous element manufactured using the method described in claim 1.

* * * * *